United States Patent
Li et al.

(10) Patent No.: US 11,822,540 B2
(45) Date of Patent: Nov. 21, 2023

(54) DATA READ METHOD AND APPARATUS, COMPUTER DEVICE, AND STORAGE MEDIUM

(71) Applicant: TENCENT TECHNOLOGY (SHENZHEN) COMPANY LIMITED, Guangdong (CN)

(72) Inventors: Haixiang Li, Shenzhen (CN); Wei Lu, Shenzhen (CN); Xiaoyong Du, Shenzhen (CN); Zhanhao Zhao, Shenzhen (CN); Anqun Pan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 197 days.

(21) Appl. No.: 17/445,669

(22) Filed: Aug. 23, 2021

(65) Prior Publication Data

US 2021/0382877 A1    Dec. 9, 2021

Related U.S. Application Data

(63) Continuation of application No. PCT/CN2020/108100, filed on Aug. 10, 2020.

(30) Foreign Application Priority Data

Aug. 27, 2019   (CN) .......................... 201910797634.7

(51) Int. Cl.
*G06F 16/00*   (2019.01)
*G06F 16/23*   (2019.01)
(Continued)

(52) U.S. Cl.
CPC ...... *G06F 16/2379* (2019.01); *G06F 16/2471* (2019.01); *G06F 16/27* (2019.01)

(58) Field of Classification Search
CPC ... G06F 16/2379; G06F 16/2471; G06F 16/27
See application file for complete search history.

(56) References Cited

U.S. PATENT DOCUMENTS 9,348,640 B2    5/2016 Horii
2006/0218206 A1*  9/2006 Bourbonnais ....... G06F 16/2379
(Continued)

FOREIGN PATENT DOCUMENTS

CN    103473318 A    12/2013
CN    106598992      4/2017
(Continued)

OTHER PUBLICATIONS

International Search Report dated Oct. 30, 2020 in PCT Application No. PCT/CN2020/108100 (with English Translation).
(Continued)

*Primary Examiner* — Alexander Khong
(74) *Attorney, Agent, or Firm* — ARENTFOX SCHIFF LLP

(57) ABSTRACT

In a data read method a plurality of tuples meeting a read condition are determined in a case that the data read request is received and according to a read condition carried in the data read request. Global transaction statuses of a plurality of global transactions corresponding to the plurality of tuples are obtained. Global commit times of the plurality of global transactions according to the global transaction statuses of the plurality of global transactions are obtained. Then a target tuple from the plurality of tuples is determined based on the global commit times of the plurality of global transactions, the target tuple being visible relative to the data read request.

20 Claims, 7 Drawing Sheets

(51) Int. Cl.
*G06F 16/2458* (2019.01)
*G06F 16/27* (2019.01)

(56) References Cited

U.S. PATENT DOCUMENTS

| | | | | |
|---|---|---|---|---|
| 2016/0253375 A1* | 9/2016 | Horii | ................... | G06F 16/2343 |
| | | | | 707/704 |
| 2018/0246945 A1* | 8/2018 | Lee | ..................... | G06F 11/3476 |
| 2018/0336258 A1* | 11/2018 | Lee | ........................ | G06F 11/36 |
| 2018/0349418 A1* | 12/2018 | Lee | ..................... | G06F 11/1446 |

FOREIGN PATENT DOCUMENTS

| | | | | | |
|---|---|---|---|---|---|
| CN | 106648840 A | * | 5/2017 | ......... | G06F 16/2322 |
| CN | 109739935 | | 5/2019 | | |
| CN | 109977171 | | 7/2019 | | |
| CN | 111190935 | | 5/2020 | | |

OTHER PUBLICATIONS

Written Opinion dated Oct. 30, 2020 in PCT Application No. PCT/CN2020/108100.
"The Art of Database Transaction Processing: Transaction Management and Concurrency Control". China Machine Press, Oct. 2017, 551 pages (with English Introduction).

* cited by examiner

DATA READ METHOD AND APPARATUS, COMPUTER DEVICE, AND STORAGE MEDIUM

RELATED APPLICATIONS

The present application is a continuation of International Application No. PCT/CN2020/108100, filed Aug. 10, 2020, which claims priority to Chinese Patent Application No. 201910797634.7, entitled "DATA READ METHOD AND APPARATUS, COMPUTER DEVICE, AND STORAGE MEDIUM" and filed on Aug. 27, 2019. The entire disclosures of the prior applications are hereby incorporated by reference in their entirety.

FIELD OF THE TECHNOLOGY

The present application relates to the field of database technologies, including a data read method and apparatus, a computer device, and a storage medium.

BACKGROUND OF THE DISCLOSURE

In a current distributed database system, there are many write operations capable of supporting node crossing. That is, one write operation may relate to a writing process for a plurality of node devices in the distributed database system. Consequently, a problem of transaction consistency of data reading may be caused.

For example, when a cross-node write operation is implemented, it is assumed that two node devices have completed a prepare phase of committing a transaction, this transaction may be committed, a first node device has committed the transaction, and a second node device is in a committing process but has not committed the transaction. In this case, a new global read operation comes into the distributed database system, data committed by the first node device is read, but data that is being committed by the second node device cannot be read since the second node device has not completed data committing. This inconsistency is referred to as a distributed read committed-committing anomaly (DRCC anomaly for short). Therefore, in a current data reading process, it cannot be ensured that read data is in a transaction-consistent state.

SUMMARY

In an exemplary aspect, in a data read method a plurality of tuples meeting a read condition are determined in a case that the data read request is received and according to a read condition carried in the data read request. Global transaction statuses of a plurality of global transactions corresponding to the plurality of tuples are obtained. Global commit times of the plurality of global transactions according to the global transaction statuses of the plurality of global transactions are obtained. Then a target tuple from the plurality of tuples is determined based on the global commit times of the plurality of global transactions, the target tuple being visible relative to the data read request.

In another exemplary aspect, a data read method includes, in a case that a global read transaction is obtained, transmitting a data read request to a plurality of node devices related to the global read transaction. The method also includes committing, by processing circuitry, the global read transaction in a case that a target tuple returned by each node device in the plurality of node devices is received. The target tuple is visible relative to the data read request, and the target tuple is determined from a plurality of tuples by each node device based on global commit times of a plurality of global transactions. The target tuple returned by each node device in a case that the global read transaction is committed is then transmitted.

In a further exemplary aspect, a data read apparatus includes processing circuitry that, in a case that a data read request is received, determines, according to a read condition carried in the data read request, a plurality of tuples meeting the read condition. The processing circuitry also obtains global transaction statuses of a plurality of global transactions corresponding to the plurality of tuples, and obtains global commit times of the plurality of global transactions according to the global transaction statuses of the plurality of global transactions. The processing circuitry then determines a target tuple from the plurality of tuples based on the global commit times of the plurality of global transactions, the target tuple being visible relative to the data read request.

BRIEF DESCRIPTION OF THE DRAWINGS

To describe the technical solutions in the embodiments of the present disclosure more clearly, the following briefly describes the accompanying drawings required for describing the embodiments. However, the accompanying drawings in the following description show merely exemplary embodiments of the present disclosure, and a person of ordinary skill in the art may still derive other accompanying drawings (and corresponding embodiments) from these accompanying drawings without creative efforts.

DESCRIPTION OF EMBODIMENTS

Figure 1:
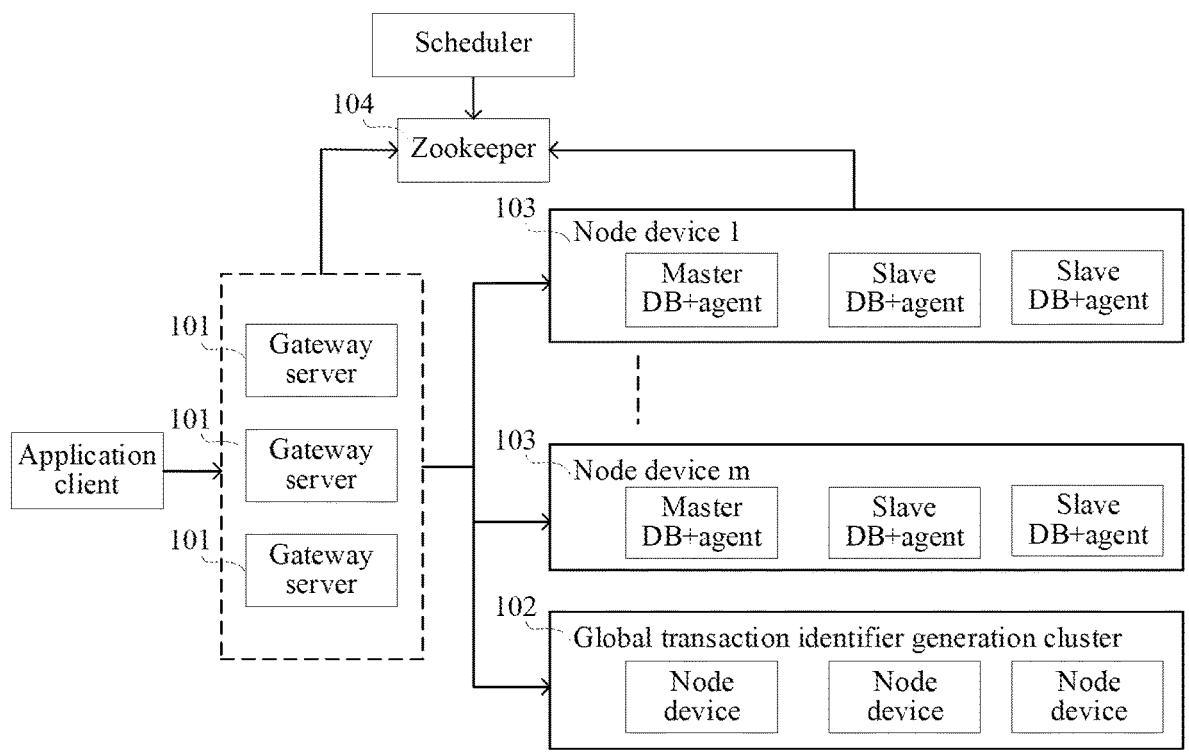
FIG. 1 is a schematic diagram of an implementation environment of a data read method according to an embodiment of the present disclosure.

To make the objectives, technical solutions, and advantages of the present disclosure clearer, the following describes exemplary embodiments of the present disclosure in further detail with reference to the accompanying drawings.

A database related to the embodiments of the present disclosure stores a plurality of data tables. Each data table may be used for storing tuples, and one tuple is one or more data items stored in a data table. The database may be any type of database based on multi-version concurrency control (MVCC). In the embodiments of the present disclosure, the type of the database is not specifically limited. Based on a state attribute, data in the foregoing database may include three states, such as a current state, a transitional state, and a historical state. The three states are collectively referred to as "a full state of data." Such data is referred to as full state data for short. Different state attributes in the full state data may be used for identifying states of data in a life cycle track thereof.

In the current state, data of the latest version of a tuple is data at a current phase. The state of data at this current phase is referred to as a current state.

The transitional state is neither the latest version nor a historical state version of a tuple, and data that is in a transitional state and in a process of changing from a current state to a historical state is referred to as half-life data.

The historical state is a state of a tuple in history, of which a value is an old value, but not a current value. A state of data at a historical phase is referred to as a historical state. There may be a plurality of historical states of one tuple, which reflect a state change process of the data. The data in the historical state can be read only, and cannot be modified or deleted.

Under an MVCC mechanism, all the three states of the data exist. Under a non-MVCC mechanism, there may only be the historical state data and the current state data. Under the MVCC mechanism or a locking-based concurrency control mechanism, a new value of the data obtained after a transaction is committed is in the current state. Taking the MVCC mechanism as an example, a state of data generated by a transaction before the smallest transaction in a currently active transaction list is in the historical state. Under the locking-based concurrency control mechanism, after a transaction is committed, a value of data before the commitment becomes a value in the historical state, that is, an old value of the tuple is in the historical state. There is still an active transaction (which is not the latest related transaction) in use in a read version. Because the latest related transaction modifies a value of the tuple, and the latest value of the tuple is already in a current state, a value that is read is already in a historical state relative to the current state. Therefore, a data state of the tuple is between the current state and the historical state, and is therefore referred to as the transitional state.

For example, under the MVCC mechanism, a balance of an account A in a user table changes from RMB 10 yuan to 20 yuan after top-up, and then changes to RMB 5 yuan by consuming RMB 15 yuan. In this case, a financial institution B has been reading the data and checking the transaction. Afterward, the balance of the account A changes to RMB 25 yuan after topping up RMB 20 yuan. RMB 25 yuan is current state data, RMB 5 yuan that B is reading is transitional state data, and the remaining two values 20 and 10 are states that have existed in history, and are both historical state data.

Based on the foregoing explanations of terms, under the MVCC mechanism, different tuples may have the same primary key. In this case, tuples having the same primary key may form a tuple set, and the tuples in the tuple set are essentially used for representing a piece of full state data. In other words, in a process of modifying (or deleting) an initial tuple having the primary key for a plurality of times, a plurality of different versions generated due to different modification (or deletion) times may form a tuple set. Therefore, in a tuple set, some tuples record current state data, some tuples record transitional state data, and some tuples record historical state data. The tuple set herein refers to an abstract and virtual set concept, and tuples in the same tuple set may be stored on different physical machines.

In addition, in the embodiments of the present disclosure, a case that a tuple is visible relative to a data read request means that the tuple is visible to a global read transaction corresponding to the data read request. In other words, whether a tuple is visible (the visibility of a tuple) is directed toward transactions, and one tuple may be visible to some transactions and invisible to some other transactions.

FIG. 1 is a schematic diagram of an implementation environment of a data read method according to an embodiment of the present disclosure. Referring to FIG. 1, the implementation environment provided in FIG. 1 may be a distributed database system. The system may include gateway servers 101, a global transaction identifier generation cluster 102, a distributed storage cluster 103, and a distributed coordination system 104 (for example, ZooKeeper).

The gateway server 101 includes circuitry that is configured to receive a read and write request and apply to the global transaction identifier generation cluster 102 for a unique global transaction identifier for a read transaction or write transaction corresponding to the read and write request based on whether the read transaction or write transaction corresponding to the read and write request is a global transaction, to ensure the consistency of data reading and writing in the entire distributed database system.

In some embodiments, the gateway server 101 may be merged with any node device in the distributed storage cluster 103 on the same physical machine. That is, a node device participating in read operations serves as the gateway server 101.

The global transaction identifier generation cluster 102 includes circuitry that is configured to generate a global transaction identifier gxid to identify a global transaction. The global transaction may refer to a transaction related to a plurality of node devices. For example, a global read transaction may be related to reading of data stored on a plurality of node devices. In another example, a global write transaction may be related to writing of data on a plurality of node devices. Generation of the global transaction identifier may be implemented in the form of a cluster, to prevent a single point of failure. When a global transaction occurs, the gateway server 101 may be used to apply to the global transaction identifier generation cluster 102 for a globally unique identifier value.

In some embodiments, the global transaction identifier generation cluster 102 may be physically independent, or may be merged with the distributed coordination system 104 (for example, ZooKeeper), to provide a global generation service of a global transaction identifier for various gateway servers 101.

The distributed storage cluster 103 may include a plurality of node devices, and each node device may be a stand-alone device or may use a master-slave structure (that is, a one-master and multiple-slave cluster). As shown in FIG. 1, illustration is made by using an example in which the node device is a one-master and two-slave cluster, where each node device includes one master and two slaves. Optionally, each master or slave is correspondingly provided with an agent device. The agent device may be physically independent of the master or slave. Certainly, the agent device may alternatively serve as an agent module on the master or slave.

The distributed coordination system 104 may include circuitry, in one or more of the node devices, that is configured to manage the gateway server 101, the global transaction identifier generation cluster 102, or the distributed storage cluster 103. Optionally, a technician may access the distributed coordination system 104 by using a scheduler on a terminal, and control the backend distributed coordination system 104 based on the frontend scheduler, to manage the clusters or servers. For example, the technician may control the ZooKeeper through the scheduler to delete one node device from the distributed storage cluster 103, to deactivate the node device.

FIG. 1 merely provides a diagram of a lightweight global transaction processing architecture, which is a quasi-distributed database system. The entire distributed database system may be considered as a logical big table jointly maintained. Data stored in the big table is scattered to node devices in the distributed storage cluster 103 through primary keys, and data stored on each node device is independent of that on other node devices, thereby implementing horizontal segmentation of node devices on the logical big table. Data tables in databases may be horizontally segmented for distributed storage in the foregoing system. Therefore, this system may be alternatively vividly referred to as an architecture with a "sharding" function.

Figure 2:
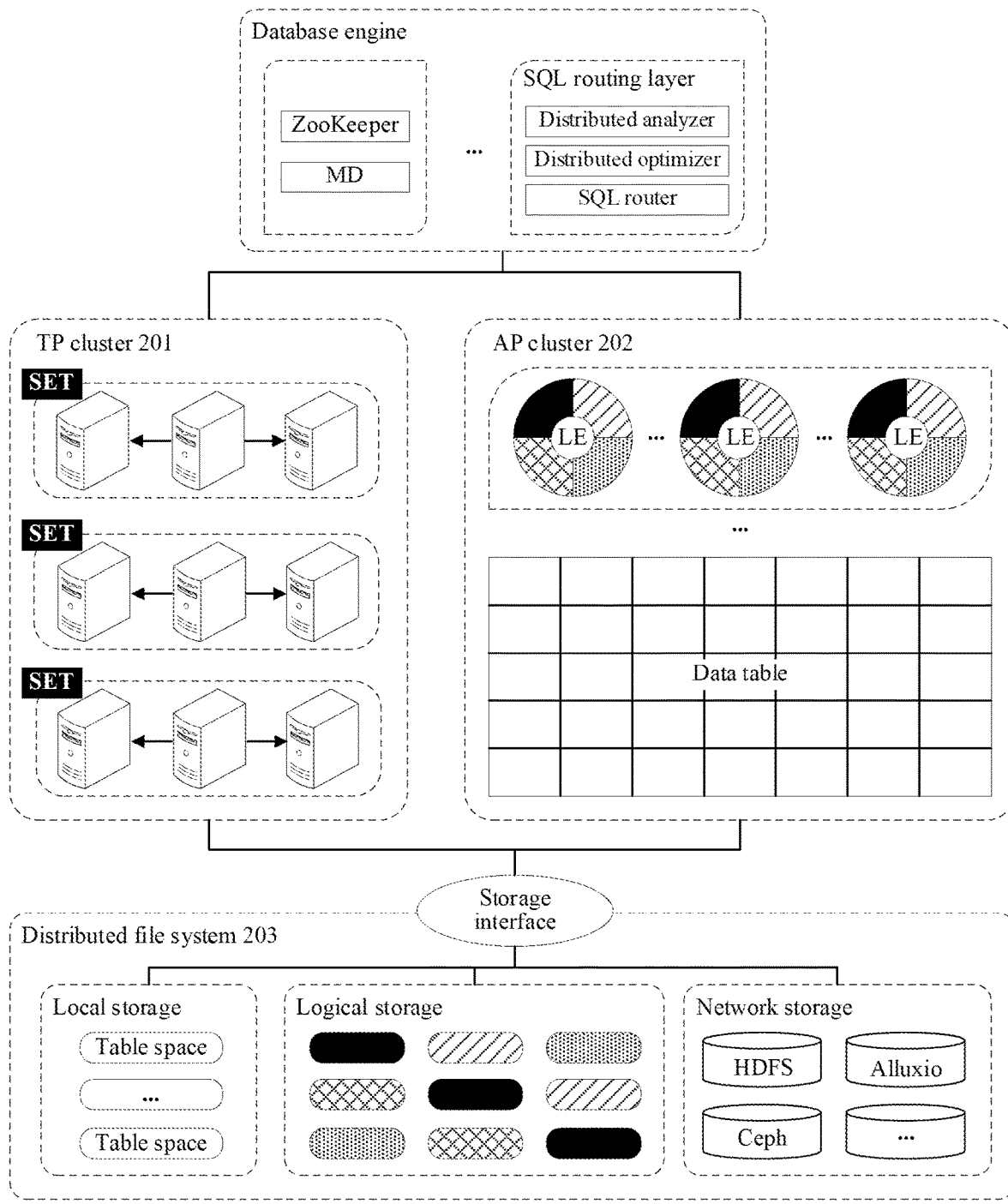
FIG. 2 is a schematic architectural diagram of a hybrid transaction/analytical cluster (HTAC) system according to an embodiment of the present disclosure.

Based on the foregoing implementation environment, in some embodiments, the distributed database system may be a hybrid transaction/analytical cluster (HTAC) system. FIG. 2 is a schematic architectural diagram of an HTAC system according to an embodiment of the present disclosure. Referring to FIG. 2, the HTAC system may include a transaction processing (TP) cluster 201 and an analytical processing (AP) cluster 202.

The TP cluster 201 may be used for providing transaction processing services, and the TP cluster 201 may include a plurality of TP node devices. During transaction processing, the TP node devices are configured to process current state data, where each TP node device may be a stand-alone device or may be a one-master and multiple-slave cluster. In the embodiments of the present disclosure, the type of the TP node device is not specifically limited.

The AP cluster 202 may be used for storing historical state data and providing historical state data query and analysis services. The AP cluster 202 may include the global transaction identifier generation cluster 102 and the distributed storage cluster 103 in the foregoing embodiment. The distributed storage cluster 103 may include a plurality of AP node devices. Certainly, each AP node device may be a stand-alone device or may be a one-master and multiple-slave cluster, and the type of the AP node device is not specifically limited in the embodiments of the present disclosure.

In the foregoing architecture, a set of a database instance of a master or a slave corresponding to each TP node device is referred to as a SET. For example, if one TP node device is a stand-alone device, a SET of the TP node device is a database instance of the stand-alone device; and if the TP node device is a one-master and two-slave cluster, the SET of the TP node device is a set of a database instance of the master and database instances of the two slaves. In this case, the consistency between data of the master and replica data of the slaves may be ensured based on a strong synchronization technology of a cloud database. Optionally, linear capacity expansion may be performed on each SET, to meet service processing requirements in the big data scenario.

Optionally, each AP node device may store historical state data generated by a TP cluster 201 in a local database, and may access a distributed file system 203 through a storage interface, to provide, through the distributed file system 203, an infinite storage function for the historical state data generated by the TP cluster 201. For example, the distributed file system 203 may be a Hadoop distributed file system (HDFS), Ceph (a distributed file system in a Linux system), Alluxio (a memory-based distributed file system), or the like.

In some embodiments, since the plurality of TP node devices may provide transaction processing services, while any transaction is committed and new current state data is generated, historical state data corresponding to the current state data is also generated. The historical state data occupies relatively large storage space and the historical state data further has conservation value, so that the plurality of TP node devices may atomically transfer the generated historical state data to the AP cluster 202 according to a predefined historical state data transfer policy. The AP node devices in the AP cluster 202 dump the historical state data based on a local executor (LE), and register metainformation of each data transfer to a metadata (MD) manager, to help the AP cluster 202 collect statistics on metainformation of stored data based on the MD manager.

In some embodiments, a user may perform routing query to find, based on a query statement, semantics of a query operation, and metadata that are provided in a structured query language router (SQL router (SR)) layer, any data stored in the TP cluster 201 or the AP cluster 202. Certainly, the TP cluster 201 mainly provides a query service for current state data, and the AP cluster 202 mainly provides a query service for historical state data.

In the HTAC system provided in this embodiment of the present disclosure, the gateway server 101 in the foregoing embodiment may be configured before each of the TP cluster 201 and the AP cluster 202, and the distributed coordination system 104 in the foregoing embodiment may be configured to manage the entire HTAC system. That is, the distributed coordination system 104 schedules at least one of the TP cluster 201 or the AP cluster 202.

Based on the HTAC system, in terms of a quantity of related node devices, transactions run in a database of the TP cluster 201 or the AP cluster 202 may be divided into two types: the first type includes transactions only related to one node device (a TP node device or an AP node device), which are referred to as non-global transactions (also referred to as local transactions), and the second type includes transactions related to a plurality of node devices (cross-node transactions), which are referred to as global transactions. Certainly, in terms of operation types of transactions, the foregoing transactions may be alternatively divided into such two types as read transactions and write transactions, where a read operation corresponds to a read transaction, and a write operation corresponds to a write transaction.

Description is made by using an example in which a global write transaction is run, a distributed database system such as the HTAC system needs to run the global write transaction based on a distributed consistency algorithm, to ensure the atomicity and consistency of data of all TP node devices related to the global write transaction when a write operation is performed. Optionally, the distributed consistency algorithm may be a two-phase commit (2PC) algorithm, an eXtended architecture (XA) standard (a distributed transaction standard of the X/Open organization, which is also essentially a 2PC algorithm), or the like.

In the foregoing process, there is a lack of a global transaction manager in the distributed database system. Consequently, although only the transaction consistency of a global write transaction in the distributed database system can be resolved by using the XA/2PC technology, the transaction consistency of a global read transaction cannot be ensured. The following describes a distributed read committed-committing (DRCC) anomaly that may occur in a global read transaction process in detail.

It is assumed that there is a global write transaction T for which a write operation needs to be performed on two node devices to implement a transfer operation from a node device 1 to a node device 2. Specifically, the global write transaction T may be implemented by using the following statements:

BEGIN GLOBAL;//apply for a global transaction identifier gxid, and assume that the gxid is 20

UPDATE user_account SET my_wallet=my_wallet −10 WHERE key=100;//node device 1, and a local transaction identifier lxid is 18

UPDATE user_account SET my_wallet=my_wallet+10 WHERE key=900;//node device 2, and a local transaction identifier lxid is 22

COMMIT;

A transaction identifier on a tuple of which a key is 100 on the node device 1 is a 2-tuple: {gxid, lxid}={20, 18}.

A transaction identifier on a tuple of which a key is 900 on the node device 2 is a 2-tuple: {gxid, lxid}={20, 22}.

According to the foregoing transaction identifiers, whether data coming from different node devices is data of the same global transaction operation, that is, whether the data belongs to the same transaction may be identified. If a next transaction of the node device 1 is a global transaction, the transaction identifier is {gxid, lxid}={21, 19}; if another next transaction is a non-global transaction, the transaction identifier is {gxid, lxid}={0, 20}; if still another next transaction is a global transaction, the transaction identifier is {gxid, lxid}={22, 21}; and so on.

Figure 3:
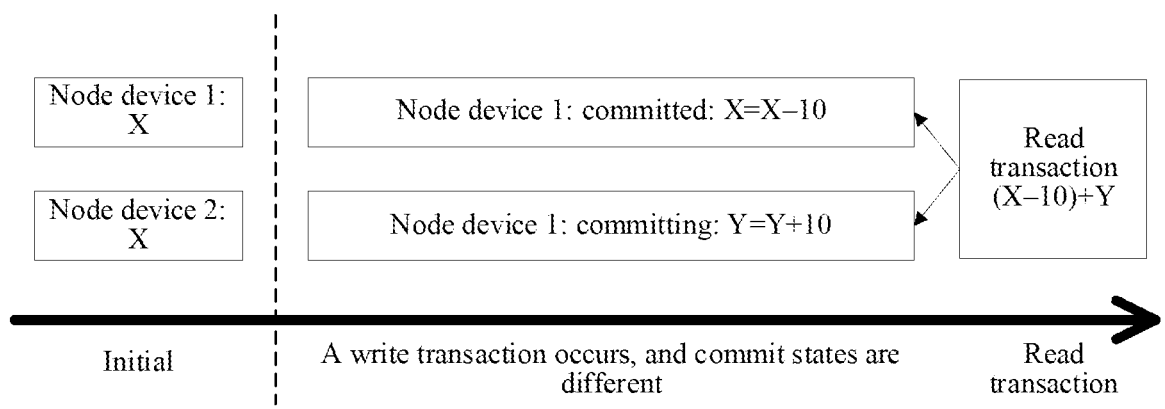
FIG. 3 is a schematic principle diagram of a distributed read committed-committing (DRCC) anomaly according to an embodiment of the present disclosure.

FIG. 3 is a schematic principle diagram of a DRCC anomaly according to an embodiment of the present disclosure. Referring to FIG. 3, it is assumed that in a commitment process of the global write transaction T, a global read transaction Q related to the node device 1 and the node device 2 is generated. When the global read transaction Q is performed on the node device 1, since the global write transaction T on the node device 1 is in a committed state, a read account amount corresponding to a tuple X of which a key is 100 on the node device 1 has been decreased by RMB 10 yuan (X−10 is read). However, when the global read transaction Q is performed on the node device 2, since the global write transaction T on the node device 2 is in a committing state, namely, the global write transaction T on the node device 2 has not been committed, a read account amount corresponding to a tuple Y of which a key is 900 on the node device 2 has not been increased by RMB 10 yuan (Y is read) consequently. As a result, when verification is performed based on values read by the global read transaction Q, a case of inconsistent transaction reading due to unbalanced transfer values may occur, and such an inconsistent case that may occur since a concurrency control method is used by the distributed database system is referred to as a DRCC anomaly.

Exemplarily, in some distributed database system-based financial accounting service processing scenarios, for example, when an account reconciliation operation (which is essentially a global read transaction) of an account reconciliation service is performed, if the account reconciliation operation and a transfer operation (which is essentially a global write transaction) are concurrently performed, the DRCC anomaly may generally occur. Because states of read tuples are different, it may be found that a sum of account balances of two parties is an anomaly during account reconciliation, leading to an anomaly of a total account amount, namely, an anomaly of the entire account reconciliation service.

In view of this, an embodiment of the present disclosure provides a data read method, to resolve the inconsistency problem such as the DRCC anomaly of a global read transaction in the distributed database system, thereby ensuring the transaction consistency when a global read operation is performed on full state data at any time (or in any time period) in the distributed database system. Detailed description is provided in the following embodiments.

This embodiment of the present disclosure is applicable to a distributed database system such as the foregoing HTAC system. In a process of running a global write transaction (that is, a cross-node write operation), a distributed consistency algorithm such as the 2PC algorithm may be improved, and when a coordinating node device receives commit confirmation responses returned by participating node devices related to the global write transaction, a global transaction status of the global write transaction is set to a committed state. Therefore, decentralized transaction status management on a global write transaction may be implemented, to help to perform the data read method provided in this embodiment of the present disclosure according to global transaction statuses of various global transactions.

Figure 4:
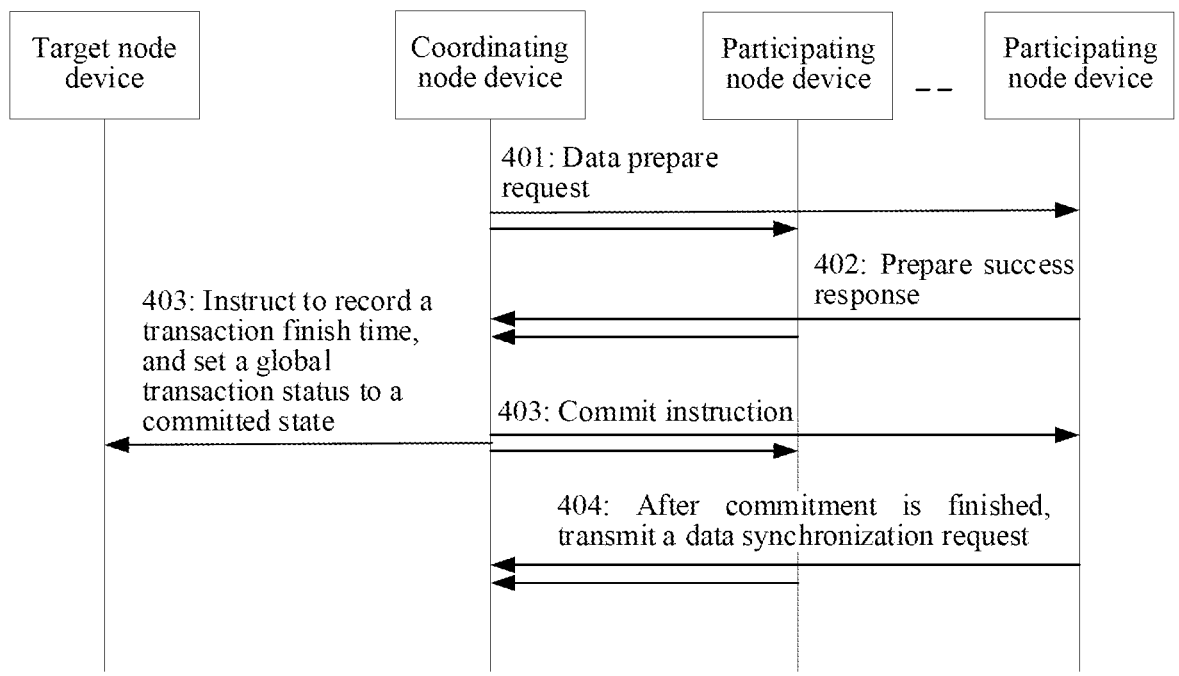
FIG. 4 is an interaction flowchart of a data write method according to an embodiment of the present disclosure.

FIG. 4 is an interaction flowchart of a data write method according to an embodiment of the present disclosure. Referring to FIG. 4, before the data read method is introduced, a data write method is described first as an implementation premise of the data read method, and the data write method of this embodiment of the present disclosure may include the following steps.

In step 401, for any global write transaction, a coordinating node device transmits data prepare requests to a plurality of participating node devices related to the global write transaction.

Optionally, node devices may be classified into a coordinating node device (coordinator) and participating node devices (participants or cohorts) according to whether a node initiates the global write transaction, where the coordinating node device may be a node device initiating the global write transaction, and the participating node devices may be node devices related to the global write transaction and other than the node device initiating the global write transaction. The coordinating node device or the participating node device is not fixed. That is, for the same node device, the node device may be a coordinating node device for some global write transactions, and may be a participating node device for some other global write transactions.

In some embodiments, when the data write method is applicable to a distributed database system, the coordinating node device may be a gateway server. In this case, description is made by using an example in which the coordinating node device is a gateway server, and step 401 may include the following sub-steps.

In sub-step 4011, when any write transaction relates to a cross-node operation, a gateway server determines the write transaction as a global write transaction, and transmits a generation request to a global transaction identifier generation cluster.

In sub-step 4011, a requesting party (for example, a financial institution requesting a transfer) of a data write service may transmit operation statements of transactions to the gateway server by using an application client on a terminal. When the gateway server receives an operation statement (for example, a structured query language (SQL) statement) of any transaction, as an advanced calculation layer of a database, the gateway server may parse the operation statement of the transaction, and when the operation statement of the transaction carries a specified keyword, the gateway server may determine the transaction as a global transaction.

For example, the specified keyword may be "GLOBAL" and is used for indicating that an operation object of the operation statement includes all data in the database system, namely, all node devices in the database system are covered. When the operation statement includes "GLOBAL," it represents that the write transaction relates to a cross-node operation, and the transaction is determined as a global transaction. Since the global transaction may include a global read transaction and a global write transaction, only the global write transaction is described in this embodiment of the present disclosure, and a read method for a global read transaction will be described in detail in a next embodiment.

In some embodiments, the gateway server may alternatively determine whether data to be written is on the same node device according to the operation statement of the write transaction, and determine the write transaction as a global write transaction if it is determined that the data is not on the same node device. Specifically, the gateway server may determine whether the data to be written is stored on two or more node devices according to a range in which data is to be written by the operation statement of the write transaction and metadata within the range, and determine the write transaction as a global write transaction when it is determined that the data is stored on two or more node devices, which represents that the write transaction relates to a cross-node operation. For example, because metadata may record a current storage device of the data, the gateway server may determine a node device to be accessed for each operation statement (for example, an SQL statement) of each transaction according to the metadata, and the gateway server records the determined node device. When a quantity of counted different node devices that are accessed is greater than or equal to 2, the write transaction is determined as a global write transaction.

The foregoing process of determining whether a write transaction is a global write transaction may be summarized as specified keyword-based identification and automatic identification that is performed by the gateway server, and if a write transaction relates to a cross-node operation, the write transaction is determined as a global write transaction. After determining a write transaction as a global write transaction, the gateway server may generate a generation request for obtaining a global transaction identifier and transmit the generation request to a global transaction identifier generation cluster.

In some embodiments, if an operation statement of a transaction relates to only a single node device, the transaction belongs to a non-global transaction also referred to as a local transaction. Therefore, there is no need to apply for a global transaction identifier, and only a non-global transaction identifier needs to be assigned to the transaction.

In sub-step 4012, when the global transaction identifier generation cluster receives the generation request, the global transaction identifier generation cluster generates a transaction start time and a global transaction identifier for the global write transaction, and transmits the transaction start time and the global transaction identifier to the gateway server.

The global transaction identifier generation cluster may use a multiple-replica mechanism to prevent a single point of failure. For example, the global transaction identifier generation cluster may deploy three replicas, five replicas, or more replicas, and with an increase in a quantity of replicas, the reliability of the global transaction identifier generation cluster may be improved, and a probability of data loss occurred in the global transaction identifier generation cluster may be reduced.

In the embodiments of the present disclosure, an assigned value of the global transaction identifier generated by the global transaction identifier generation cluster is monotonically increased along with time and is essentially a timestamp. The assigned value of the global transaction identifier may represent an occurrence time of the global write transaction, and a larger assigned value of the global transaction identifier indicates a later occurrence time of the global write transaction in a time sequence of committed global write transactions. For example, the global transaction identifier may be in any form such as a value type, a time type, or a character type that may represent a timestamp.

In sub-step 4013, after receiving the transaction start time and the global transaction identifier, the gateway server instructs, by using the global transaction identifier as a transaction identifier of the global write transaction, a target node device to record the global transaction identifier and the transaction start time of the global write transaction, and instructs the target node device to set a global transaction status of the global write transaction to a running state.

In the foregoing process, the target node device is configured to store the global transaction status of the global write transaction, and the target node device may be any node device related to the global write transaction. For example, the target node device may be a coordinating node device (such as the gateway server), and certainly, the target node device may be alternatively any participating node device.

In some embodiments, the gateway server may determine the target node device in a random selection manner. For example, the gateway server randomly selects a target node device from a plurality of participating node devices related to the global write transaction.

For example, if the global write transaction T relates to performing a write operation on three participating node devices Na, Nb, and Nc, the gateway server randomly selects one of the three participating node devices as a target node device, and then the target node device stores a global transaction status of the global write transaction and synchronizes the global transaction status with other participating node devices.

In the foregoing process, the target node device is randomly specified in the participating node devices, so that a problem of data skew among the participating node devices may be avoided, and loads among the participating node devices may be balanced.

In some embodiments, the gateway server may alternatively determine the target node device according to a specified rule. For example, the gateway server determines a participating node device that is first accessed in a plurality of participating node devices related to the global write transaction as the target node device.

For example, if the global write transaction T relates to performing a write operation on three participating node devices Na, Nb, and Nc, the gateway server determines the participating node device Na that is first accessed as a target node device, and then the participating node device Na stores a global transaction status of the global write transaction and synchronizes the global transaction status with other participating node devices.

In the foregoing process, the participating node device that is first accessed is determined as the target node device, so that a commitment state of the global transaction may be obtained in time, thereby reducing a latency that may occur when the global transaction status is updated.

As can be seen in the foregoing two manners of specifying a target node device, no matter whether the target node device is randomly selected or selected according to a specified rule, compared with a centralized management mechanism in which the gateway server is used as the target node device, by delegating the global transaction status to a participating node device for maintenance, a decentralized management mechanism may be presented when the distributed database system manages the global transaction status, thereby optimizing the global transaction status management mechanism. Based on the decentralized management mechanism, when a global read transaction is run subsequently, in a process of establishing a global transaction snapshot of the global read transaction, a global transaction status may be synchronized among participating node devices, so that there is no need to apply to the gateway server for a centralized global transaction status, thereby avoiding network signaling overheads generated by frequently obtaining the global transaction status from the gateway server. Instead, the global transaction status may be obtained from any participating node device after the synchronization, thereby improving the performance of the global read transaction.

After determining the target node device, the gateway server may transmit a first transaction status update instruction to the target node device, and the first transaction status update instruction may carry a global transaction identifier, a transaction start time, and a current transaction state of the global write transaction. The transaction start time and the global transaction identifier are returned by the global transaction identifier generation cluster, and the current transaction state is a running state. Further, when receiving the first transaction status update instruction, the target node device records the global transaction identifier and the transaction start time, and sets the global transaction status to a running state.

In some embodiments, in the target node device, the global transaction identifier, the global transaction status, and the transaction start time may be maintained by using a transaction status tuple. That is, in the target node device, each global transaction may correspond to one transaction status tuple, and the transaction status tuple includes at least one of a global transaction identifier gxid, a transaction start time start_time, a transaction finish_time finish_time, a global transaction status, or a node device identifier nodes of each global transaction. In the foregoing case, when the transaction status tuple includes all the five items, the transaction status tuple is a 5-tuple {gxid, start_time, finish_time, status, nodes}.

The gxid has been described in sub-step 4012 and is not described herein again.

The start_time represents a start timestamp of a global transaction, the start_time may use a logical clock, a physical clock, or a hybrid logical clock provided that the start_time is globally sequentially increased, and a start time of the transaction is recorded when the global transaction is started.

The finish_time represents a committed/aborted timestamp of a global transaction and may also use a logical clock, a physical clock, or a hybrid logical clock provided that the finish_time is globally sequentially increased, and a finish time of the transaction is recorded when the global transaction is committed/aborted.

The status represents a current state of a global transaction, which includes a running state, a preparing state, a committing state, a committed state, an aborting state, and an aborted state, and the six states are described in detail below.

The running state is a state that represents that the global transaction is being run, namely, a phase in which sub-steps 4011 to 4013 are located, where the global write transaction has been run, but the coordinating node device has not transmitted the data prepare request.

The preparing state is a state that represents that the global transaction is currently in a prepare phase, namely, a phase in which sub-step 4014 is located, where the coordinating node device has transmitted the data prepare request, but has not received prepare success responses or prepare failure responses returned by all the participating node devices.

The committing state is a state that represents that the global transaction has completed the prepare phase and is currently in a committing phase, namely, a phase in which step 403 is located, where the coordinating node device has transmitted the commit instruction, but has not received commit success responses returned by all the participating node devices.

The committed state is a state that represents that the global transaction has been globally committed, namely, all the participating node devices have committed the global transaction, and the coordinating node device has received commit success responses returned by all the participating node devices.

The aborting state is a state that represents that the global transaction is currently in an aborting phase, namely, when receiving a prepare failure response returned by any participating node device, the coordinating node device transmits an abort instruction to all the participating node devices but has not received abort success responses returned by all the participating node devices.

The aborted state is a state that represents that the global transaction has been globally aborted, namely, all the participating node devices have aborted the global transaction, and the coordinating node device has received abort success responses returned by all the participating node devices.

The nodes represent various node devices (including a coordinating node device and a participating node device) related to a current global transaction.

Based on the transaction status tuple described above, when receiving the first transaction status update instruction, the target node device may create a transaction status tuple for the global write transaction in a local transaction status list, record, in the transaction status tuple, the global transaction identifier and the transaction start time that are carried in the first transaction status update instruction, and set the global transaction status to a running state. Optionally, the first transaction status update instruction may further carry a node device identifier, so that the target node device may record the node device identifier in the transaction status tuple. Certainly, the global write transaction has not been completed, so that the transaction finish time may be temporarily set to empty or an initial value in the transaction status tuple.

In sub-step 4014, the gateway server transmits data prepare requests to a plurality of participating node devices related to the global write transaction, and instructs the target node device to set the global transaction status of the global write transaction to a preparing state.

Figure 5:
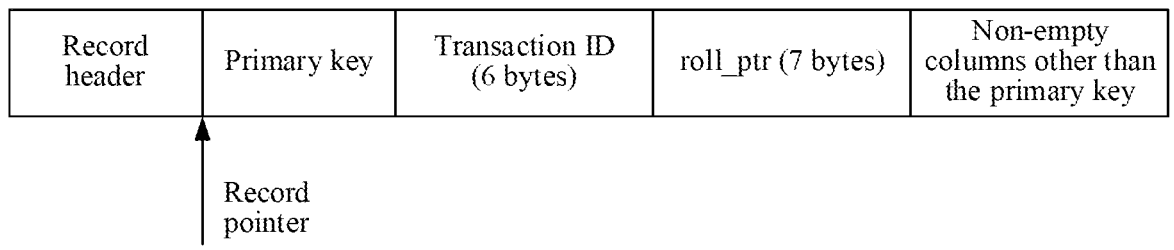
FIG. 5 is a schematic diagram of a tuple structure of a conventional database system according to an embodiment of the present disclosure.

FIG. 5 is a schematic diagram of a tuple structure of a conventional database system according to an embodiment of the present disclosure. As shown in FIG. 5, for a database system, a tuple structure in a conventional database system (for example, MySQL/InnoBD) may include a record header, a primary key, a transaction ID (that is, the transaction identifier, and 6 bytes are generally included), roll_ptr (a pointer pointing to a previous tuple corresponding to the primary key, and 7 bytes are generally included), and other non-empty columns other than the primary key.

Figure 6:
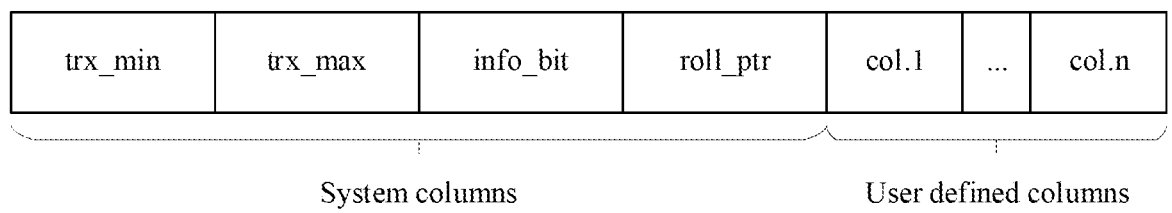
FIG. 6 is a schematic diagram of a tuple structure of a distributed database system according to an embodiment of the present disclosure.

FIG. 6 is a schematic diagram of a tuple structure of a distributed database system according to an embodiment of the present disclosure. In the distributed database system in this embodiment of the present disclosure, if the MVCC technology is supported, structure adjustment may be performed on a tuple transmitted in the data prepare request, and an adjusted tuple structure is shown in FIG. 6, where system columns and user defined columns are included in a tuple. The system columns may include trx_min (representing transaction information generating the tuple), trx_max (representing transaction information modifying the tuple to a historical state tuple), info_bit (representing an operation state of the tuple), and roll_ptr (a pointer pointing to a previous tuple of a primary key corresponding to the tuple). The user defined columns may include a total of n data items of col.1 to col.n that are defined by a user, where n is any integer greater than or equal to 1.

In the adjusted tuple structure, the transaction information (no matter whether the transaction information is trx_min or trx_max) recorded on the tuple may be represented by using a 3-tuple {gxid, lxid, node}, where the gxid is a global transaction identifier, the lxid is a local transaction identifier, and the node is used for representing node devices on which the transaction information is currently stored, so as to quickly determine storage positions of the transaction information in the distributed database system. Assigned values of both the local transaction identifier and the global transaction identifier may be monotonously increased.

Based on the tuple structure, in step 4014, the gateway server may write the global transaction identifier returned by the global transaction identifier generation cluster into the gxid in the 3-tuple transaction information corresponding to the trx_min in the tuple structure, transmit data prepare requests to a plurality of participating node devices related to the global write transaction, and wait for prepare success responses or prepare failure responses returned by the participating node devices, so as to determine, according to the returned responses, whether there is a need to initiate a commit procedure of the global transaction. The data prepare request is determined according to a write operation required by the global write transaction on each participating node device, and different participating node devices generally correspond to different data prepare requests.

After transmitting a data prepare request to each of all the participating node devices, the gateway server may transmit a second transaction status update instruction to the target node device, and the second transaction status update instruction may carry the global transaction identifier and a current transaction state (that is, a preparing state). When receiving the second transaction status update instruction, the target node device queries, in response to the second transaction status update instruction, a transaction status tuple corresponding to the global transaction identifier in the transaction status list according to the global transaction identifier, and sets the global transaction status from a running state to a preparing state in the transaction status tuple.

In sub-steps 4011 to 4014, using the coordinating node device being the gateway server as an example, before the coordinating node device transmits the data prepare requests to the participating node devices, how to maintain the global transaction status (for example, maintained in the form of a transaction status tuple) on the target node device based on a decentralized management mechanism is described. However, although description is made by using a global write transaction as an example in this embodiment of the present disclosure, in the distributed database system, not only a global transaction status of a global write transaction may be maintained, but also a global transaction status of a global read transaction may be maintained, thereby completely recording global transaction statuses of all global transactions.

In some embodiments, the target node devices in the distributed database system may merely maintain a global transaction status of a global write transaction permanently, and maintain a global transaction status of a global read transaction only in a transaction running process. After the global read transaction is committed/aborted, the global transaction status of the global read transaction is deleted. In this case, a state of data in the database may be only changed by a write transaction, permanent maintenance of a global transaction status of a global read transaction is omitted, and the global transaction status is only temporarily maintained in a transaction running process, thereby saving local storage space of the target node devices.

In step 402, when receiving the data prepare requests, the participating node devices perform a prepare operation of data writing on the global write transaction, and the participating node devices return prepare success responses to the coordinating node device after the prepare is completed.

Description is made by using any participating node device in the plurality of participating node devices as an example. When receiving the data prepare request, the participating node device enters a prepare phase of the global write transaction, and for to-be-written data that is required by the global write transaction, writes Undo information and Redo information of the data into a transaction log of a local critical region. However, the transaction is not committed, and when the Undo information and the Redo information are successfully written into the transaction log, the participating node device returns a prepare success response to the coordinating node device. Certainly, in some embodiments, if the participating node device fails to write the Undo information and the Redo information into the transaction log, the participating node device may return a prepare failure response to the coordinating node device.

In step 403, when receiving a prepare success response returned by each node device in the plurality of node devices, the coordinating node device transmits a commit instruction to the plurality of participating node devices, to instruct a target node device to record a transaction finish time of the global write transaction, and instruct the target node device to set a global transaction status of the global write transaction to a committed state.

In the foregoing process, the coordinating node device receives the prepare success responses or prepare failure responses returned by the participating node devices, and when all the participating node devices return prepare success responses, it may be considered as a global prepare success. The coordinating node device may perform step 403, to transmit a commit instruction to all the participating node devices to enter a commit phase of the 2PC algorithm, apply to the global transaction identifier generation cluster for a transaction finish time (finish_time, which is essentially a timestamp), and transmit a third transaction status update instruction to the target node device, where the third transaction status update instruction carries the global transaction identifier, the transaction finish time, and a current transaction state (that is, a committed state). When receiving the third transaction status update instruction, the target node device queries, in response to the third transaction status update instruction, a transaction status tuple corresponding to the global transaction identifier in the transaction status list according to the global transaction identifier, records the transaction finish time carried in the third transaction status update instruction in the transaction status tuple, and sets the global transaction status from a preparing state to a committed state.

In some embodiments, when receiving a prepare failure response returned by any participating node device in the plurality of participating node devices, the coordinating node device may transmit an abort instruction to the plurality of participating node devices, to instruct the target node device to set the global transaction status of the global write transaction to an aborting state. When receiving an abort finish response returned by each participating node device in the plurality of participating node devices, the coordinating node device instructs the target node device to record the transaction finish time of the global write transaction, and instructs the target node device to set the global transaction status of the global write transaction to an aborted state.

In the foregoing process, provided that a prepare failure response is returned by any one or more participating node devices, it may be considered as a global prepare failure. In this case, the coordinating node device performs the operation of transmitting an abort instruction, and may transmit a fourth transaction status update instruction to the target node device, where the fourth transaction status update instruction carries the global transaction identifier and a current transaction state (that is, an aborting state). When receiving the fourth transaction status update instruction, the target node device queries, in response to the fourth transaction status update instruction, a transaction status tuple corresponding to the global transaction identifier in the transaction status list according to the global transaction identifier, and sets the global transaction status from a preparing state to an aborting state in the transaction status tuple.

Further, the coordinating node device waits for abort finish responses returned by the participating node devices, applies, when all the participating node devices return abort finish responses, to the global transaction identifier generation cluster for a transaction finish time, and transmits a fifth transaction status update instruction to the target node device, where the fifth transaction status update instruction carries the global transaction identifier, the transaction finish time, and a current transaction state (that is, an aborted state). When receiving the fifth transaction status update instruction, the target node device queries, in response to the fifth transaction status update instruction, a transaction status tuple corresponding to the global transaction identifier in the transaction status list according to the global transaction identifier, records the transaction finish time carried in the fifth transaction status update instruction in the transaction status tuple, and sets the global transaction status from an aborting state to an aborted state.

In step 404, when any global write transaction is committed, each participating node device transmits a data synchronization request to a target node device corresponding to the global write transaction, and receives a global transaction status returned by the target node device, the target node device being configured to store the global transaction status of the global write transaction.

In the foregoing process, for any participating node device, every time a global write transaction is committed, the participating node device transmits a data synchronization request to a target node device corresponding to the global write transaction. Since the target node device may maintain a global transaction status by using a transaction status tuple, after receiving the data synchronization request, the target node device may query a corresponding transaction status tuple in a local transaction status list according to the data synchronization request, and return the transaction status tuple to the participating node device. The participating node device receives the transaction status tuple, and persistently stores the transaction status tuple. For example, the transaction status tuple may be stored in a local magnetic disk, or may be stored in a cloud database.

In step 404, when a transaction is committed, the participating node devices immediately perform real-time synchronization of the global transaction status, to shorten a network latency of a global transaction status synchronization process, so that the participating node devices may quickly obtain a global transaction status of a completed transaction in real time.

In some embodiments, when the transaction is committed, the participating node devices may alternatively not perform synchronization of the global transaction status immediately, but implement delayed synchronization of the global transaction status. For example, for any participating node device, in response to that a currently run transaction relates to the target node device of the global write transaction, incremental synchronization between the participating node device and the target node device is performed; or incremental synchronization between the participating node device and the target node device is performed at intervals of a target time length.

In the former delayed synchronization manner, when necessary communication is generated between the participating node device and the target node device, the participating node device locally synchronizes the global transaction status of the global write transaction corresponding to the target node device and committed before the currently run transaction (a read or write transaction). Correspondingly, the participating node device may be a target node device of another global write transaction, so that the target node device may also locally synchronize a part of global transaction status stored in the participating node device.

That is, when necessary communication is generated between the participating node device and the target node device, the two parties mutually transmit to-be-synchronized transaction status tuples, thereby implementing batched and bidirectional data synchronization between the participating node device and the target node device. Optionally, after each synchronization is completed, a checkpoint may be set, so that incremental synchronization may be performed when data synchronization is performed next time. In this synchronization manner, incremental synchronization of a global transaction status is transmitted along with a currently run transaction, thereby avoiding an extra round of communication in a transaction commit phase, so that network signaling overheads of a global transaction status during synchronization are reduced.

In the latter delayed synchronization manner, incremental synchronization is performed once at intervals of a target time length between the participating node device and the target node device, where the target time length may be any value greater than 0 (zero), and the target time length may be set by a technician by using a scheduler. The incremental synchronization manner is similar to the former manner, and details are not described herein again. According to the scheduled polling delayed synchronization manner, incremental synchronization of a global transaction status may be triggered periodically, thereby avoiding an excessively long latency problem that a global transaction status of a previous global transaction cannot be synchronized locally when no necessary communication has been generated between the participating node device and the target node device for a long time.

In the foregoing, after the transaction is globally committed, the global transaction status of the global write transaction is only stored on the target node device at the beginning. Therefore, to store the global transaction status on all the participating node devices, the participating node devices can synchronize the global transaction status locally no matter in the real-time synchronization manner or the delayed synchronization manner. That is, for a transaction that has been globally committed, a global transaction status of the transaction that has been globally committed may be stored on each participating node device by using a synchronization mechanism. Therefore, when a global read transaction is run subsequently, the global transaction status may be obtained from any participating node device, so that concurrent determination of a transaction may be accelerated at some participating node devices locally, thereby avoiding extra network signaling overheads.

For example, a global write transaction T relates to participating node devices Na, Nb, Nc, and Nd, where Na is a target node device. After the global write transaction T is globally committed, the target node device Na synchronizes a transaction status tuple (including a global transaction status of the global write transaction T) of the global write transaction T to the participating node devices Nb, Nc, and Nd. A technician may define a synchronization policy among node devices based on a scheduler, for example, define the synchronization policy as real-time synchronization or one type of delayed synchronization through parameter control.

For any participating node device, after the participating node device locally synchronizes a global transaction status of a global transaction, the global transaction status obtained through synchronization becomes valid immediately, and the valid global transaction status may be used for concurrent determination of transactions immediately. In some embodiments, if a global transaction status of a transaction to be concurrently determined is in asynchronization-unfinished state (that is, a related global transaction status cannot be queried locally), the participating node device needs to obtain the global transaction status of the transaction from a remote to-be-synchronized node device. Detailed description will be made in a next embodiment by using an example in which the transaction to be concurrently determined is a global read transaction.

As can be seen in steps 401 to 404, before the global write transaction is globally committed, update of the global transaction status is a unidirectional and synchronous write process, and the coordinating node device unidirectionally and synchronously instructs the target node device to update the global transaction status.

Any combination of the foregoing optional technical solutions may be used to form an optional embodiment of the present disclosure. Details are not described herein again.

In a conventional 2PC algorithm, when all the participating node devices return prepare success responses to the coordinating node device, the global write transaction enters a committing state, and only when all the participating node devices return commit finishing responses to the coordinating node device, the global write transaction enters a committed state.

In the embodiments of the present disclosure, the conventional 2PC algorithm is improved. When all the participating node devices return prepare success responses to the coordinating node device, the coordinating node device directly considers that the global write transaction enters a committed state, instructs the target node device to set the global transaction status of the global write transaction to a committed state, and delivers a commit instruction to the participating node devices. In this algorithm logic, after the 2PC commit phase of the transaction is completed, data operated by the transaction has been written into the participating node devices for persistent storage, so that it is feasible to set the global transaction status to a committed state in advance. According to the foregoing improvement manner, the commit phase of the 2PC algorithm may be converted into an asynchronous process, thereby simplifying a transaction commit procedure, improving the transaction processing efficiency, and helping to ensure the data consistency of a global read transaction subsequently.

According to the method provided in this embodiment of the present disclosure, for any global write transaction, when all the participating node devices return prepare success responses to the coordinating node device, the coordinating node device applies to the global transaction identifier generation cluster for a transaction finish time, and instructs the target node device to record the transaction finish time and set the global transaction status to a committed state. In this way, the commit phase of the 2PC algorithm is converted into an asynchronous process, thereby simplifying the transaction commit procedure, improving the transaction processing efficiency, and helping to ensure the data consistency of a global read transaction subsequently.

Further, after the transaction is globally committed, synchronization of the global transaction identifier is performed among the target node device and the participating node devices, and the global transaction status may be obtained from any participating node device when a global read transaction is run subsequently, so that concurrent determination of a transaction may be accelerated at some participating node devices locally, thereby avoiding extra network signaling overheads.

Further, in a case of real-time synchronization, a network latency of a global transaction status synchronization process may be shortened, so that the participating node devices may quickly obtain a global transaction status of a completed transaction in real time.

Further, in a case of delayed synchronization, if incremental synchronization is performed when necessary communication is generated, an extra round of communication may be prevented from being generated in a transaction commit phase, thereby reducing network signaling overheads of a global transaction status during synchronization. Alternatively, if incremental synchronization is performed at intervals of a target time length, an excessively long latency problem that a global transaction status of a previous global transaction cannot be synchronized locally when no necessary communication has been generated between the participating node device and the target node device for a long time may be avoided.

Further, the coordinating node device specifies a target node device in the participating node devices, and delegates the global transaction status to the target node device for maintenance, so that the distributed database system may present a decentralized management mechanism when managing the global transaction status, and the global transaction status management mechanism is optimized. As a result, when a global read transaction is run subsequently, in a process of establishing a global transaction snapshot of the global read transaction, network signaling overheads generated by frequently obtaining the global transaction status from the gateway server are avoided, thereby improving the performance of the global read transaction.

Further, the coordinating node device randomly specifies a target node device in the participating node devices, so that a problem of data skew among the participating node devices may be avoided, and loads among the participating node devices may be balanced. Alternatively, the coordinating node device determines a participating node device that is first accessed as a target node device, so that a commitment state of the global transaction may be obtained in time, thereby reducing a latency that may occur when the global transaction status is updated.

Further, in the target node device, the global transaction status is maintained in the form of a transaction status tuple, and at least one of a global transaction identifier, a transaction start time, a transaction finish time, a global transaction status, or a node device identifier is recorded in the transaction status tuple, which greatly helps to uniformly manage a plurality of pieces of information of a global transaction, and optimizes storage forms of the plurality of pieces of information corresponding to the global transaction.

In the foregoing embodiment, the data write process in the distributed database system is described. Based on the improved 2PC algorithm performed on the global write transaction in the foregoing embodiment and the decentralized global transaction status management mechanism in the foregoing embodiment, a data read method provided in this embodiment of the present disclosure is described in detail under this premise.

Figure 7:
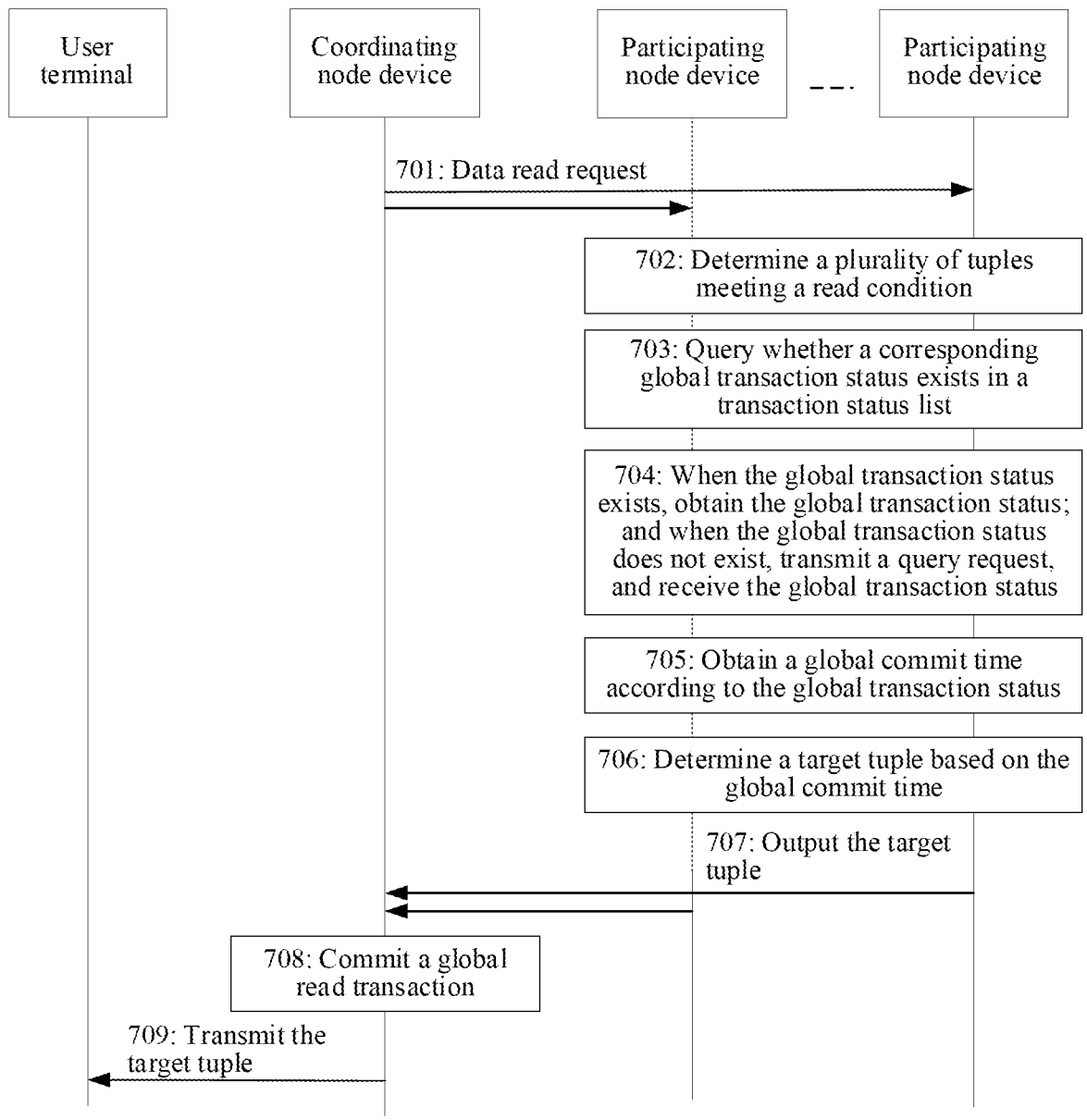
FIG. 7 is an interaction flowchart of a data read method according to an embodiment of the present disclosure.

FIG. 7 is an interaction flowchart of a data read method according to an embodiment of the present disclosure. Referring to FIG. 7, this embodiment includes the following steps.

In step 701, in a case that a global read transaction is obtained, a coordinating node device transmits a data read request to a plurality of participating node devices related to the global read transaction.

The coordinating node device herein refers to a node device initiating the global read transaction. For example, the coordinating node device may be a gateway server in a distributed database system. The participating node devices herein refer to node devices related to the global read transaction and other than the node device initiating the global read transaction.

The coordinating node device and the participating node device in this embodiment of the present disclosure are merely differently named due to different identities for a global read transaction. Any node device in the distributed database system may become a coordinating node device or a participating node device. Different global transactions correspond to different coordinating node devices or participating node devices, and the same node device may be a coordinating node device of some transactions and may be a participating node device of some other transactions. In addition, description is made by using any global read transaction as an example in this embodiment of the present disclosure. Therefore, the coordinating node device in this embodiment of the present disclosure and the coordinating node device in the foregoing embodiment are not required to be necessarily the same node device, and the participating node devices are not required to be necessarily a plurality of identical node devices, the coordinating node device and the participating node devices are determined by properties of the transaction.

Step 701 is similar to step 401, namely, step 701 may include the following sub-steps:

In sub-step 7011, when any read transaction relates to a cross-node operation, a coordinating node device determines the read transaction as a global read transaction, and transmits a generation request to a global transaction identifier generation cluster.

Using the coordinating node device being a gateway server as an example, a requesting party (for example, a financial institution requesting an audit) of a data read service transmits operation statements of read transactions to the gateway server by using an application client on a terminal. When receiving an operation statement of any read transaction, the gateway server parses the operation statement of the read transaction, and determines the read transaction as a global read transaction when the operation statement of the read transaction carries a specified keyword. For example, the specified keyword may be "GLOBAL."

Optionally, the gateway server may alternatively determine a global read transaction. For example, the gateway server may determine, according to a range of data to be read by the operation statement of the read transaction and metadata within the range, whether the data to be read is stored on two or more node devices, and determines the read transaction as a global read transaction when determining that the data is stored on two or more node devices, which represents that the read transaction relates to a cross-node operation.

The process of transmitting a generation request in sub-step 7011 is similar to the process of transmitting a generation request in sub-step 4011. Details are not described herein again.

In sub-step 7012, After the global transaction identifier generation cluster receives the generation request, the global transaction identifier generation cluster generates a transaction start time and a global transaction identifier for the global read transaction, and transmits the transaction start time and the global transaction identifier to the coordinating node device.

Sub-step 7012 is similar to step 4012. Details are not described herein again.

In sub-step 7013, after receiving the transaction start time and the global transaction identifier, the coordinating node device instructs, by using the global transaction identifier as a transaction identifier of the global read transaction, a target node device to record the global transaction identifier and the transaction start time of the global read transaction, and instructs the target node device to set a global transaction status of the global read transaction to a running state.

Sub-step 7013 is similar to step 4013. Details are not described herein again.

Using the coordinating node device being a gateway server as an example, the gateway server may determine a target node device in a random selection manner, so that a problem of data skew among the participating node devices may be avoided, and loads among the participating node devices may be balanced. Alternatively, the gateway server may alternatively determine a target node device according to a specified rule. For example, the gateway server determines a participating node device that is first accessed as a target node device, so that a commitment state of the global transaction may be obtained in time, thereby reducing a latency that may occur when the global transaction status is updated.

Similarly, the target node device may alternatively maintain at least one of a global transaction identifier, a transaction start time, a transaction finish time, a global transaction status, or a node device identifier of a global read transaction in the form of a transaction status tuple, which greatly helps to uniformly manage a plurality of pieces of information of a global transaction, and optimizes storage forms of the plurality of pieces of information corresponding to the global transaction.

Similarly, after determining the target node device, the gateway server may transmit a sixth transaction status update instruction to the target node device, and the sixth transaction status update instruction may carry a global transaction identifier, a transaction start time, and a current transaction state of the global read transaction. The transaction start time and the global transaction identifier are returned by the global transaction identifier generation cluster, and the current transaction state is a running state.

Further, when receiving the sixth transaction status update instruction, the target node device may create a transaction status tuple for the global read transaction in a local transaction status list, record the global transaction identifier and the transaction start time that are carried in the sixth transaction status update instruction in the transaction status tuple, and set the global transaction status to a running state.

Optionally, the sixth transaction status update instruction may further carry a node device identifier, so that the target node device may record the node device identifier in the transaction status tuple. Certainly, the global read transaction has not been completed, so that the transaction finish time may be temporarily set to empty or an initial value in the transaction status tuple.

In sub-step 7014, the coordinating node device transmits data prepare requests to a plurality of participating node devices related to the global read transaction, and instructs the target node device to set the global transaction status of the global read transaction to a preparing state.

A tuple transmitted in the data prepare request may also have the adjusted tuple structure shown in FIG. 6.

Sub-step 7014 is similar to step 4014. Details are not described herein again.

Using the coordinating node device being a gateway server as an example, the gateway server may write the global transaction identifier returned by the global transaction identifier generation cluster into the gxid in the 3-tuple transaction information corresponding to the trx_min in the tuple structure, and transmit data prepare requests to a plurality of participating node devices related to the global read transaction. After transmitting the data prepare requests, the gateway server transmits a seventh transaction status update instruction to the target node device, where the seventh transaction status update instruction may carry the global transaction identifier and a current transaction state (that is, a preparing state). When receiving the seventh transaction status update instruction, the target node device queries, in response to the seventh transaction status update instruction, a transaction status tuple corresponding to the global transaction identifier in a transaction status list according to the global transaction identifier, and sets the global transaction status from a running state to a preparing state in the transaction status tuple.

In step 702, when receiving the data prepare request, each participating node device determines, according to a read condition carried in the data read request, a plurality of tuples meeting the read condition.

The read condition is used for indicating data to be read. For example, the read condition may be reading all data in a user table. In another example, the read condition may be reading data within a primary key range, for example, reading data within a range of [100, 1000] in which the key is located.

In the foregoing process, each participating node device parses the data read request to obtain the read condition, to query a plurality of tuples meeting the read condition in a database. For example, in the HTAC architecture, the TP cluster maintains tuples corresponding to current state data or transitional state data, the AP cluster maintains tuples corresponding to historical state data, the coordinating node device transmits a data read request to each of participating node devices of the TP cluster and participating node devices of the AP cluster, and each participating node device of the clusters queries a plurality of tuples meeting the read condition.

In step 703, for a global transaction identifier recorded on any tuple in the plurality of tuples, each participating node device queries whether a global transaction status corresponding to the global transaction identifier exists in a local transaction status list.

In the foregoing process, as can be seen in FIG. 6, transaction information of two transactions is recorded on system columns of each tuple structure, where one is transaction information trx_min generating the tuple, and the other is transaction information trx_max modifying the tuple to a historical state tuple, and transaction information of each transaction is represented by using a 3-tuple {gxid, lxid, node}. A current state tuple has not been modified to a historical state tuple, so that the trx_max in the tuple structure may be temporarily empty, but transaction information of at least one transaction may be recorded on each tuple.

In view of this, for any transaction in the at least one transaction recorded on each tuple, each participating node device may obtain a global transaction identifier of the transaction from transaction information of the transaction, and query, in a local transaction status list, whether any transaction status tuple in the transaction status list may be hit by using the global transaction identifier of the transaction as an index, to perform step 704.

When the global transaction identifier of the transaction is 0, indicating that the transaction is not a global transaction, a DRCC anomaly that may occur in a global read operation may not be triggered. Therefore, there is no need to perform the following steps, and visibility determination may be directly performed according to a visibility determination algorithm of a conventional stand-alone database system. Details are not described herein again, and this embodiment of the present disclosure only focuses on a case that the transaction is a global transaction.

In step 704, each participating node device obtains the global transaction status corresponding to the global transaction identifier in a case that the global transaction status exists; or each participating node device transmits a query request to a plurality of node devices corresponding to the global transaction identifier and receives the global transaction status returned by any node device in the plurality of node devices in a case that the global transaction status does not exist.

In the foregoing process, when any transaction status tuple in the transaction status list may be hit, it is considered that the global transaction status corresponding to the global transaction identifier exists, and each participating node device obtains a current value of the status as the global transaction status from the transaction status tuple.

Certainly, if no transaction status tuple in the transaction status list may be hit, it is considered that the global transaction status corresponding to the global transaction identifier does not exist, and each participating node device may determine node devices recorded in the node in the transaction information 3-tuple {gxid, lxid, node} of the transaction as a plurality of node devices corresponding to the global transaction identifier, and transmit a query request carrying the global transaction identifier to the plurality of node devices. After receiving the query request, the plurality of node devices perform a similar query process, to query whether any transaction status tuple may be hit in a local transaction status list by using the global transaction identifier as an index. When any transaction status tuple is hit, the transaction status tuple is returned to a sender of the query request; and when no transaction status tuple is hit, a query failure response or no response is returned to the sender of the query request.

In a possible implementation, ordered storage may be performed in a local transaction status list of each node device in ascending order of global transaction identifiers. Therefore, querying may be performed according to an algorithm such as binary search during querying to improve the query efficiency in the transaction status list.

For each participating node device, no corresponding transaction status tuple exists in the local transaction status list, so that there are two cases that may generate the foregoing result, where one case is that a global transaction indicated by the global transaction identifier has not been globally committed, and the other case is that the global transaction indicated by the global transaction identifier has been globally committed but a current participating node device has not completed data synchronization. Therefore, one of the two cases to which the global transaction corresponding to the global transaction identifier belongs may be determined by transmitting a query request to the node devices.

Further, for each participating node device, there is no need to wait for all the node devices to return the global transaction status (or the transaction status tuple), and step 705 may be performed provided that any node device returns the global transaction status. The reason lies in that once any node device may return the global transaction status, it is proved that the transaction has been globally committed and data synchronization is performed on the node device, so that there is no need to wait for another node device to return the global transaction status subsequently.

In some embodiments, another possible case is that the transaction has not been globally committed. In this case, only a target node device corresponding to the transaction returns the global transaction status to the participating node device, none of other node devices returns the global transaction status (data synchronization is not performed before the transaction is globally committed), and step 705 is still performed.

In some embodiments, if none of all the node devices returns the global transaction status, the node devices need to restart the global read transaction until a node device returns the global transaction status.

In the foregoing process, a participating node device broadcasts (or multicasts) a query request to a plurality of node devices to obtain a global transaction status of a global transaction, thereby avoiding a failure generated due to a shutdown of a node device. Certainly, in some embodiments, the participating node device may alternatively transmit a query request to a target node device of each global transaction every time, and then perform an operation of broadcasting the query request to all node devices when the target node device is shut down.

In the foregoing steps 703 and 704, description is made by using a global transaction as an example. Each participating node device performs the foregoing steps 703 and 704 repeatedly on each global transaction recorded on each tuple, to obtain global transaction statuses of a plurality of global transactions corresponding to the plurality of tuples in a decentralized global transaction status management mechanism.

As can be seen in the foregoing steps 703 and 704, each participating node device obtains the global transaction status from one or more node devices in the distributed database system, thereby avoiding frequent generation of network signaling overheads. In some embodiments, the global transaction statuses of the global transactions may be alternatively stored by a gateway server in a centralized manner, and the procedure of obtaining a global transaction status may be simplified in this centralized management mechanism.

In step 705, each participating node device obtains global commit times of the plurality of global transactions according to the global transaction statuses of the plurality of global transactions.

In the foregoing process, the data read request may carry a specified time, or may carry a specified time period. When the data read request carries a specified time, the data read request is used for querying a tuple meeting the consistency at the specified time. For example, the specified time is identified by using SYSTEM_TIME AS OF time_expr in the data read request. When the data read request carries a specified time period, the data read request is used for querying tuples meeting the consistency within a time period from a start time to an end time. For example, the time period from the start time time_expr to time_expr2 is identified by using SYSTEM_TIME BETWEEN time_expr AND time_expr2 in the data read request.

In the embodiments of the present disclosure, how to obtain a global commit time (commit_Ts) in each of a case that the data read request carries a specified time and a case that the data read request carries a specified time period is described. The commit_Ts obtained herein is a value provided for the visibility determination algorithm to determine the visibility of a tuple. Different values are assigned to the commit_Ts in different cases according to global transaction statuses of global transactions, and each global transaction uniquely corresponds to one commit_Ts.

When the data read request carries a specified time, for any global transaction corresponding to any tuple in the plurality of tuples, any participating node device in the participating node devices may obtain the global commit time according to at least one of the following.

In a first aspect, if a global transaction status of the global transaction at the specified time is a committed state or a committing state, the participating node device sets the global commit time of the global transaction to a value obtained by adding the specified time to any positive number in a case that a transaction finish time of the global transaction is greater than the specified time; and the participating node device sets the global commit time of the global transaction to the transaction finish time in a case that the transaction finish time of the global transaction is not greater than the specified time.

For example, in the foregoing process, assuming that Ts represents the specified time carried in the data read request, after obtaining a transaction status tuple of the global transaction, the participating node device determines whether a current value of the status in the transaction status tuple {gxid, start_time, finish_time, status, nodes} is a committed state or a committing state, and the participating node device determines whether finish_time>Ts.

The reason why determination logic is performed herein lies in that the current value of the status can only represent that the global transaction status at a current time is a committed state, and the specified time Ts may not necessarily be the current time (Ts≤the current time), so that there is a need to determine the global transaction status of the global transaction at the running time Ts.

If finish_time>Ts, it indicates that the global transaction is actually in a running state or a preparing state at the specified time Ts. Therefore, the global transaction has not been globally committed at the specified time Ts, and the participating node device sets the commit_Ts to Ts+n, where n is any positive number.

Otherwise, if finish_time≤Ts, it indicates that the global transaction is actually in a committing state or a committed state at the specified time Ts. The 2PC algorithm is improved in the foregoing embodiment, namely, a global write transaction is determined as being globally committed in advance at a committing phase. Therefore, provided that finish_time≤Ts, it is considered that the global transaction has been globally committed at the specified time Ts, and the commit_Ts is set to the finish_time.

In a second aspect, if a global transaction status of the global transaction at the specified time is a running state or a preparing state, the participating node device sets the global commit time of the global transaction to a value obtained by adding the specified time to any positive number.

Based on the assumption in the foregoing example, if the current value of the status in the transaction status tuple {gxid, start_time, finish_time, status, nodes} is a running state or a preparing state, it indicates that the global transaction is in a running state or a preparing state at a current time, so that the global transaction has necessarily not been globally committed at the specified time Ts, and the participating node device directly sets the commit_Ts to Ts+n, where n is any positive number.

In a third aspect, if a global transaction status of the global transaction at the specified time is an aborted state or an aborting state, the participating node device sets the global commit time of the global transaction to a value obtained by adding the specified time to any positive number.

Based on the assumption in the foregoing example, if the current value of the status in the transaction status tuple {gxid, start_time, finish_time, status, nodes} is an aborting state or an aborted state, the participating node device also determines whether finish_time>Ts. The reason for performing determination logic herein is similar to that in the first aspect, and details are not described herein again.

If finish_time>Ts, it indicates that the global transaction is actually in a running state, a preparing state, or an aborting state at the specified time Ts. Therefore, the global transaction has not been globally committed at the specified time Ts, and the participating node device sets the commit_Ts to Ts+n, where n is any positive number.

Otherwise, if finish_time≤Ts, it indicates that the global transaction is actually in an aborted state at the specified time Ts, namely, the global transaction has been globally aborted at the specified time Ts, and the participating node device still sets the commit_Ts to Ts+n, where n is any positive number.

As can be seen from the foregoing analysis, the foregoing second and third aspects may be summarized as follows. If the global transaction status of the global transaction at the specified time is any one of a running state, a preparing state, an aborted state, or an aborting state, the participating node device sets the global commit time of the global transaction to a value obtained by adding the specified time to any positive number.

In the foregoing first to third aspects, all six states of possible values of the status describe how to assign a value to the commit_Ts. In the distributed database system, if a global write transaction is not globally committed, a global transaction status of the global write transaction may be updated in a running process of the global read transaction, leading to a DRCC anomaly. According to any one of the foregoing manners, a global transaction status meeting a consistency condition at the specified time Ts may be found in the distributed database system, and the global transaction status meeting the consistency condition at the specified time Ts is quantified by assigning a value to the commit_Ts, so that a subsequent visibility determination algorithm may directly determine the visibility of a tuple in a value comparison manner, namely, the transaction consistency of a global read operation may be ensured.

When the data read request carries a specified time period, for any global transaction corresponding to any tuple in the plurality of tuples, any participating node device in the participating node devices performs an operation of obtaining a corresponding global commit time based on each of a start time and an end time of the specified time period.

Optionally, the participating node device may perform an operation of obtaining global commit times of the plurality of global transactions at the start time based on the start time of the specified time period; and perform an operation of obtaining global commit times of the plurality of global transactions at the end time based on the end time of the specified time period.

Specifically, when the global commit time at the start time is obtained, the start time of the specified time period may be considered as the "specified time Ts" in the foregoing process, so that an assigned value of the commit_Ts at the start time is obtained by performing the manners provided in the foregoing first to third aspects. Similarly, the end time of the specified time period is considered as the "specified time Ts" in the foregoing process, and an assigned value of the commit_Ts at the end time is obtained by performing the manners provided in the foregoing first to third aspects.

In the foregoing case, the global transaction status of each transaction is a directed change process, so that a complex operation of obtaining the commit_Ts within the entire specified time period is converted into a simple operation of obtaining the commit_Ts at the start time and the commit_Ts at the end time of the specified time period, and a global transaction status meeting a consistency condition of the transaction within the specified time period may be identified by determining the commit_Ts at the start time and the commit_Ts at the end time of the specified time period of the transaction. The global transaction status meeting the consistency condition within the specified time period is quantified, so that a subsequent visibility determination algorithm may directly determine the visibility of a tuple in a value comparison manner, namely, the transaction consistency of a global read operation may be ensured.

In the foregoing two cases, how each participating node device obtains the global commit time according to the global transaction status is described from each of perspectives of reading data according to a time point (specified time) and reading data according to a time period (specified time period). Quantifying the global transaction status meeting the consistency condition according to the global commit time is equivalent to providing a transaction status extraction algorithm in the distributed database system, and a global transaction status (which is represented by using an assigned value of the commit_Ts) at a time point or within a time period may be extracted based on the transaction status extraction algorithm. Further, each participating node device performs step 706 to determine a target tuple in a plurality of tuples by using a decentralized full state visibility determination algorithm.

In step 706, each participating node device determines a target tuple from the plurality of tuples based on the global commit times of the plurality of global transactions, the target tuple being visible relative to the data read request.

A case that a tuple is visible relative to a data read request means that the tuple is visible to a global read transaction corresponding to the data read request. In other words, the visibility of a tuple is directed to transactions, and one tuple may be visible to some transactions and invisible to some other transactions. Therefore, the target tuple is a tuple visible to the data read request in step 701.

In the embodiments of the present disclosure, how any participating node device in the participating node devices determines the visibility of any tuple is described in each of a case that the data read request carries a specified time and a case that the data read request carries a specified time period as follows.

In a case that the data read request carries a specified time, for any tuple in the plurality of tuples, the participating node device determines the tuple as a target tuple in response to that a global commit time of a global transaction generating the tuple is less than the specified time and a global commit time of a global transaction modifying the tuple is greater than the specified time.

In the foregoing process, one tuple is visible to one specified time, which is equivalent to requiring the specified time to fall within a valid time range of the tuple. That is, for any tuple, two conditions need to be met when determining that the tuple is visible relative to the specified time Ts: in a first condition a transaction generating the tuple has been globally committed at the specified time; and in a second condition a transaction modifying the tuple has not been globally committed at the specified time.

In step 705, a value has been assigned to the commit_Ts of each transaction corresponding to each tuple, so that the two conditions may be correspondingly converted into the following two inequalities:

In the first condition $v.trx\_min.commit\_ts<Ts$, which ensures that a global commit time of the transaction generating the tuple is less than the specified time Ts, thereby ensuring that the transaction generating the tuple has been globally committed at the specified time.

In the second condition $v.trx\_max.commit\_ts>Ts$, which ensures that a global commit time of the transaction modifying the tuple is greater than the specified time Ts, thereby ensuring that the transaction modifying the tuple has not been globally committed at the specified time.

In the foregoing process, when both the commit_Ts of the transaction trx_min generating the tuple and the commit_Ts of the transaction trx_max modifying the tuple meet a system of inequalities formed by the foregoing two inequalities, it may be considered that a tuple v is visible relative to the specified time Ts, and the tuple v is determined as a target tuple. In other words, each participating node device determines, according to a specified time and transaction information of transactions on a tuple, whether the tuple is a target tuple.

In a case that the data read request carries a specified time period, for any tuple in the plurality of tuples, the participating node device determines the tuple as a target tuple in response to that a global commit time of a global transaction generating the tuple is less than an end time of the specified time period and a global commit time of a global transaction modifying the tuple is greater than a start time of the specified time period.

In the foregoing process, one tuple is visible to one specified time period, which is equivalent to requiring the specified time period to intersect (having an intersection) with a valid time range of the tuple. That is, for any tuple, two conditions need to be met when determining that the tuple is visible relative to a specified time period Ts1 to Ts2 in a first condition a transaction generating the tuple has been globally committed at the end time Ts2 of the specified time period; and in a second condition a transaction modifying the tuple has not been globally committed at the start time Ts1 of the specified time period.

In step 705, a value has been assigned to the commit_Ts of each transaction corresponding to each tuple, so that the two conditions may be correspondingly converted into the following two inequalities:

In the first condition $v.trx\_min.commit\_ts<Ts2$, which ensures that a global commit time of the transaction generating the tuple is less than the end time Ts2 of the specified time period, thereby ensuring that the transaction generating the tuple has been globally committed at the end time Ts2 of the specified time period.

In the second condition $v.trx\_max.commit\_ts>Ts1$, which ensures that a global commit time of the transaction modifying the tuple is greater than the start time Ts1 of the specified time period, thereby ensuring that the transaction modifying the tuple has not been globally committed at the start time Ts1 of the specified time period.

In the foregoing process, when both the commit_Ts of the transaction trx_min generating the tuple and the commit_Ts of the transaction trx_max modifying the tuple meet a system of inequalities formed by the foregoing two inequalities, it may be considered that a tuple v is visible relative to the specified time period Ts1 to Ts2, and the tuple v is determined as a target tuple. In other words, each participating node device determines, according to a specified time period and transaction information of transactions on a tuple, whether the tuple is a target tuple.

In the foregoing two cases, how each participating node device determines the visibility of a tuple, namely, determines a target tuple from a plurality of tuples, according to global commit times commit_Ts of two transactions corresponding to the tuple is described from each of perspectives of reading data according to a time point (specified time) and reading data according to a time period (specified time period). Therefore, this process is equivalent to providing a full state visibility determination algorithm in a distributed database system. The full state visibility determination algorithm may act on any node device in the distributed database system, and ensure that a tuple read by the node device meets the global transaction consistency, thereby avoiding the occurrence of a DRCC anomaly.

Further, the full state visibility determination algorithm may be described by using the following pseudocode:

```
Algorithm 1: v.visible (Ts, Ts1, Ts2, T)
Input: Ts: Timestamp
Input: Ts1, Ts2: Time interval
Input: T: Query type
Output: visibility
if T = AS-OF then
   if (v.trx-min.commit-ts<T ∧ v.trx_max.commit_ts>Ts) then
      return visible;
if T = BETWEEN AND then
   if (v.trx_min.commit_ts<Ts2 ∧ v.trx_max.commit_ts>Ts1) then
      return visible;
return invisible;
```

In the embodiments of the present disclosure, value ranges of time points are as follows: Ts≤a current time, Ts2≤a current time, and Ts1<Ts2.

In steps 705 and 706, when data is read according to a specified time, a consistency read operation of full state data may be divided into the following two policies according to different values of the specified time:

In a current consistency read policy, a cross-node global read transaction specifies a transaction start time of the global read transaction as a required consistency point, namely, Ts=start_time, so that data reading according to a "current time point" may be performed based on the transaction status extraction algorithm provided in step 705 and the full state visibility determination algorithm provided in step 706, to obtain a visible tuple (that is, a target tuple) on each node device in the distributed database system, thereby ensuring that the process of globally reading data meets the transaction consistency.

In a historical consistency read policy, a cross-node global read transaction specifies a time point earlier than a transaction start time of the global read transaction as a required consistency point, namely, Ts<start_time, so that data reading according to a "historical time point" may be performed based on the transaction status extraction algorithm provided in step 705 and the full state visibility determination algorithm provided in step 706, to obtain a historical visible tuple (that is, a target tuple) on each node device in the distributed database system, namely, a historical tuple set meeting the consistency point is found, thereby ensuring that the process of globally reading data meets the transaction consistency.

In step 707, each participating node device outputs the target tuple to the coordinating node device.

In the foregoing process, the entire distributed database system adopts a decentralized management mechanism for the global transaction statuses of the global transactions, so that when a global read transaction is run, each participating node device directly performs the decentralized transaction status extraction algorithm and the decentralized full state visibility determination algorithm locally, to directly locally determine and output the target tuple. Therefore, only in need of one round of communication, the coordinating node device may directly obtain the target tuple meeting the consistency condition from each participating node device without frequently obtaining centralized global transaction statuses and determining the target tuple through a plurality of rounds of communication, thereby shortening a response latency of the entire database system and reducing network signaling overheads of a global read transaction.

In step 708, when receiving the target tuple returned by each participating node device in the plurality of participating node devices, the coordinating node device commits the global read transaction, the target tuple being determined from a plurality of tuples by each participating node device based on global commit times of a plurality of global transactions.

A commit procedure of the global read transaction in step 708 is similar to the commit procedure of a global write transaction in step 403 in the foregoing embodiment, and details are not described herein again.

In other words, after receiving the target tuples returned by all the participating node devices, the coordinating node device transmits a commit instruction to all the participating node devices, applies to the global transaction identifier generation cluster for a transaction finish time, and transmits an eighth transaction status update instruction to the target node device, where the eighth transaction status update instruction carries the global transaction identifier, the transaction finish time, and a current transaction state (that is, a committed state). When receiving the eighth transaction status update instruction, the target node device queries, in response to the eighth transaction status update instruction, a transaction status tuple corresponding to the global transaction identifier in the transaction status list according to the global transaction identifier, records the transaction finish time carried in the eighth transaction status update instruction in the transaction status tuple, and sets the global transaction status from a preparing state to a committed state.

Certainly, if one participating node device encounters an anomaly (for example, a global transaction status is not obtained locally, and no node device returns a global transaction status after a query request is broadcast), there is a need to instruct the coordinating node device to restart the global read transaction. Therefore, the coordinating node device transmits an abort instruction to the participating node devices, and perform an abort procedure of the 2PC algorithm similar to that in step 403, and details are not described herein again. After the abort procedure is completed, the coordinating node device performs operations performed in steps 701 to 708 again.

In step 709, the coordinating node device transmits the target tuple returned by each of the participating node device in a case that the global read transaction is committed.

In the foregoing process, after all the participating node devices commit the global read transaction, the coordinating node device summarizes the target tuples transmitted by the participating node devices, and transmits all the summarized target tuples to a terminal of a user (a requesting party of the data read service).

In some embodiments, after transmitting the target tuples, the coordinating node device may further transmit a delete instruction carrying the global transaction identifier of the global read transaction to the participating node devices, where the delete instruction is used for instructing to delete the global transaction status of the global read transaction. When receiving the delete instruction, each participating node device may query a transaction status tuple corresponding to the global transaction identifier in a local transaction status list according to the global transaction identifier of the global read transaction, and delete the queried transaction status tuple. In this way, permanent maintenance of global transaction statuses of global read transactions is omitted, and only temporary maintenance is performed in a running process of a global read transaction, thereby saving local storage space of the participating node devices.

In another case, steps 707 to 709 may be alternatively not performed. Instead, after determining a target tuple every time, each participating node device directly outputs the target tuple to a terminal corresponding to the user in real time. In this case, the global read transaction may be affected by shutdown of the participating node devices. For example, if one participating node device is shut down after a part of data is read, after the participating node device is restored, the participating node device needs to instruct the terminal corresponding to the user that a returned target tuple is invalid.

Any combination of the foregoing optional technical solutions may be used to form an optional embodiment of the present disclosure. Details are not described herein again.

According to the method provided in this embodiment of the present disclosure, when a data read request is received, according to a read condition carried in the data read request, a plurality of tuples meeting the read condition are determined. Since global transaction statuses of global transactions are maintained in the database system, global transaction statuses of a plurality of global transactions corresponding to the plurality of tuples are obtained. The obtained global transaction statuses are all global transaction statuses meeting a consistency condition for the data read request, so that global commit times of the plurality of global transactions are obtained according to the global transaction statuses of the plurality of global transactions. That is, in different global transaction statuses, different values are assigned to the global commit time, which is equivalent to quantifying the global transaction statuses meeting the consistency condition. Therefore, visibility determination may be performed on the tuples based on the global commit times of the plurality of global transactions, to determine a target tuple from the plurality of tuples, and the target tuple is visible relative to the data read request. The global transaction statuses are maintained in the database system, so that after the global transaction statuses meeting the consistency condition are found, to perform visibility determination conveniently, different global commit times are assigned to different global transaction statuses. Therefore, the visibility of a tuple is directly determined based on the global commit time, thereby avoiding the occurrence of a DRCC anomaly, and ensuring that data read in a data reading process is in a transaction-consistent state, namely, ensuring the transaction consistency of a global read operation in the database system.

Further, when the data read request carries a specified time, value assignment logic for the global commit time when the global transaction status is in each of six states is provided. According to the value assignment logic, the global commit time may accurately depict the global transaction status meeting the consistency condition by using values, thereby simplifying subsequent processing logic of a visibility determination algorithm.

Further, when the data read request carries a specified time period, an operation of obtaining a corresponding global commit time is performed based on each of a start time and an end time of the specified time period. The global transaction status of each transaction is a directed change process, so that a complex operation of obtaining the global commit time within the entire specified time period may be converted in the foregoing manner into a simple operation of obtaining the global commit time at the start time and the global commit time at the end time of the specified time period, thereby reducing the complexity of obtaining a global commit time within a specified time period.

Further, when the data read request carries a specified time, according to the specified time, global commit times of transactions generating the tuples, and global commit times of transactions modifying the tuples, target tuples of which a valid time range includes the specified time may be accurately determined, thereby ensuring the accuracy of tuple visibility determination.

Further, when the data read request carries a specified time period, according to the specified time period, global commit times of transactions generating the tuples, and global commit times of transactions modifying the tuples, target tuples of which a valid time range intersects with the specified time period may be accurately determined, thereby ensuring the accuracy of tuple visibility determination.

Further, when a global transaction status is obtained, querying is first performed in a local transaction status list. If the corresponding global transaction status cannot be locally found, a query request is transmitted to other node devices, and a next procedure of obtaining a global commit time may be entered provided that any node device returns the global transaction status. According to the foregoing embodiment, in a decentralized global transaction status management mechanism, frequent generation of network signaling overheads may be avoided in a process of obtaining a global transaction status. There is no need to wait for all the node devices to return the global transaction status. The reason lies in that, based on the data synchronization mechanism of this embodiment, once any node device can return the global transaction status, it is proved that the transaction has been globally committed and data synchronization is performed on the node device, so that there is no need to wait for another node device to return the global transaction status subsequently, thereby shortening a response time length of a data reading process.

Figure 8:
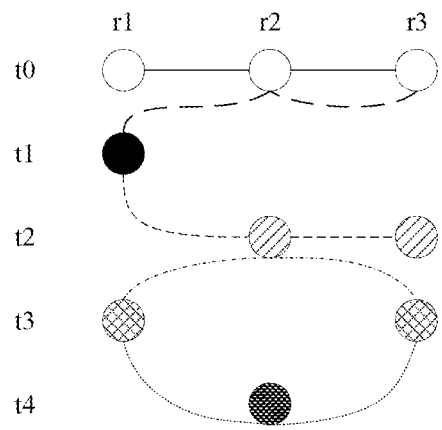
FIG. 8 is a schematic diagram of a transaction consistency point according to an embodiment of the present disclosure.

FIG. 8 is a schematic diagram of a transaction consistency point according to an embodiment of the present disclosure. Referring to FIG. 8, assuming that there are three data items which are r1, r2, and r3 (the three items may be distributed on different node devices) in an HTAC system, consistency states from a time t0 to a time t4 are analyzed below:

Initial tuples $r1^0$, $r2^0$, and $r3^0$ are in a consistency state, where in the figure, a white circle is used to represent the initial tuple, and a solid line is used to represent the consistency state at the time t0.

When a global write transaction occurs, a data state of a tuple may change (change from a current state to a transitional state or a historical state). For example, a global write transaction T1 is globally committed at a time t1, and the tuple $r1^0$ is modified to generate a corresponding first tuple $r1^1$, where in the figure, a black circle is used to represent the first tuple, and a long-dashed line is used to represent a consistency state at the time t1.

Then, a global write transaction T2 is globally committed at a time t2, and the tuples $r2^0$ and $r3^0$ are modified to generate two corresponding second tuples $r2^2$ and $r3^2$, where in the figure, a circle filled with diagonals is used to represent the second tuple, and a short-dashed line is used to represent a consistency state at the time t2.

Then, a global write transaction T3 is committed at a time t3, and the tuples $r1^1$ and $r3^2$ are modified to generate two corresponding third tuples $r1^3$ and $r3^3$, where in the figure, a circle filled with meshes is used to represent the third tuple, and a dot-dash line is used to represent a consistency state at the time t3.

Then, a global write transaction T4 is committed at the time t4, and the tuple $r2^2$ is modified to generate a corresponding fourth tuple $r2^4$, where in the figure, a circle filled with lattice points is used to represent the fourth tuple, and a dotted line is used to represent a consistency state at the time t4.

Through operations of the series of global write transactions T1 to T4, a total of 5 consistency states, that is, a solid line, a long-dashed line, a short-dashed line, a dot-dash line, and a dotted line shown in the figure are generated by performing observation in a dimension of full state data. Each curve may represent one consistency state. If there is a need to query historical state tuples at historical times such as t1.5 and t3.5, a target tuple visible relative to this global read transaction from historical state tuples meeting the consistency state shown by curves in the figure can be found based on constraints of the transaction status extraction algorithm and the full state visibility determination algorithm provided that the data read method provided in the embodiments of the present disclosure is applied.

Analysis is performed below on the DRCC anomaly to demonstrate that the data read method in the present disclosure may avoid the occurrence of the foregoing DRCC anomaly:

Using a write transaction related to two node devices as an example with reference to FIG. 3, it is assumed that a global write transaction T performs a write operation on a tuple x(n) on a node device A and generates a new tuple x(n+1); and performs a write operation on a tuple y(n) on a node device B and generates a new tuple y(n+1). Classified discussions are performed below on whether the tuples x(n) and y(n) are visible.

First, when the data read request carries a specified time, for the tuples x(n) and y(n), it is assumed that each of transactions (which may not be the same transaction) generating the tuples meets a visibility determination condition, namely, a global commit time of a transaction generating the tuple x(n) is less than the specified time, and a global commit time of a transaction generating the tuple y(n) is less than the specified time. In this case, transactions modifying the tuples x(n) and y(n) continue to be determined, and the transactions modifying the tuples x(n) and y(n) are the same global write transaction T. Therefore, according to assigned values of a global commit time of the determined global write transaction T in combination with the full state visibility determination algorithm, whether outputted tuples meet the transaction consistency of a read operation is verified.

If the node device A and the node device B have committed the global write transaction T at the specified time, the global transaction status is a committed state. A transaction finish time is necessarily less than the specified time, and the global commit time is set to the transaction finish time. In this case, the global commit time is also less than the specified time, and it is determined that x(n) and y(n) are necessarily invisible to a global read operation in combination with the full state visibility determination algorithm. Therefore, the node device A and the node device B may output the latest committed tuples, namely, output x(n+1) and y(n+1) respectively, and the transaction consistency of the global read operation is met in this case.

If the node device A has committed the global write transaction T, but the node device B has not committed the global write transaction T at the specified time (that is, a case that a DRCC anomaly is generated in a conventional algorithm), the global transaction status is a committing state. The node device A can commit the global write transaction, so that it is proved that the specified time is necessarily after finishing of global preparing, and the coordinating node device has transmitted the commit instruction. The 2PC algorithm is improved in the present disclosure, so that after the finishing of the global preparing, the coordinating node device may instruct the target node device to directly set the global transaction status to a committed state, and a transaction finish time has been recorded in the transaction status tuple. In this case, the global commit time of the global write transaction T can be obtained by only comparing the transaction finish time with the specified time, so that whether the tuples x(n) and y(n) are visible to the data read request may be determined in combination with the full state visibility determination algorithm.

In this case, if the global commit time is greater than the specified time, it is determined that x(n) and y(n) are both visible, and the node device A and the node device B output x(n) and y(n) respectively; and if the global commit time is less than the specified time, it is determined that x(n) and y(n) are both invisible, and the node device A and the node device B output x(n+1) and y(n+1) respectively. In this case, the transaction consistency of the global read operation is met.

If the node device A and the node device B have aborted the global write transaction T at the specified time, the global transaction status is an aborted state. In this case, the global commit time is set to a value obtained by adding the specified time to any positive number. As a result, the global commit time is greater than the specified time, and it is determined that x(n) and y(n) are both visible in combination with the full state visibility determination algorithm. Therefore, the node device A and the node device B may output x(n) and y(n) respectively, and the transaction consistency of the global read operation is met in this case.

If the node device A has aborted the global write transaction T, but the node device B has not aborted the global write transaction T at the specified time, the global transaction status is an aborting state. In this case, the global commit time is set to a value obtained by adding the specified time to any positive number. As a result, the global commit time is greater than the specified time, and it is determined that x(n) and y(n) are both visible in combination with the full state visibility determination algorithm. Therefore, the node device A and the node device B may output x(n) and y(n) respectively, and the transaction consistency of the global read operation is met in this case.

If the node device A and the node device B have prepared the global write transaction T at the specified time, a transaction finish time has been recorded in the transaction status tuple since the global transaction status is set to a committed state in advance in the present disclosure. Similarly, the global commit time of the global write transaction T may be obtained by comparing the transaction finish time with the specified time, so that whether the tuples x(n) and y(n) are visible to the data read request may be determined in combination with the full state visibility determination algorithm.

In this case, if the global commit time is greater than the specified time, it is determined that x(n) and y(n) are both visible, and the node device A and the node device B output x(n) and y(n) respectively; and if the global commit time is less than the specified time, it is determined that x(n) and y(n) are both invisible, and the node device A and the node device B output x(n+1) and y(n+1) respectively. In this case, the transaction consistency of the global read operation is met.

If the node device A has prepared the global write transaction T, but the node device B has not prepared the global write transaction T at the specified time, the global transaction status is a preparing state. In this case, the global commit time is set to a value obtained by adding the specified time to any positive number. As a result, the global commit time is greater than the specified time, and it is determined that x(n) and y(n) are both visible in combination with the full state visibility determination algorithm. Therefore, the node device A and the node device B may output x(n) and y(n) respectively, and the transaction consistency of the global read operation is met in this case.

If neither the node device A nor the node device B has prepared the global write transaction T at the specified time, the global transaction status is a running state. In this case, the global commit time is set to a value obtained by adding the specified time to any positive number. As a result, the global commit time is greater than the specified time, and it is determined that x(n) and y(n) are both visible in combination with the full state visibility determination algorithm. Therefore, x(n+1) and y(n+1) cannot be read definitely, the node device A and the node device B output x(n) and y(n) respectively, and the transaction consistency of the global read operation is met in this case.

In the foregoing process, classified discussions have been performed on all cases that may occur, and as can be seen, the data read method of the present disclosure may meet the transaction consistency of the global read operation in all cases. Certainly, analysis is performed above for a case that the data read request carries a specified time. However, when the data read request carries a specified time period, a start time and an end time of the specified time period are each considered as a "specified time" to perform the full state visibility determination algorithm. Therefore, provided that the transaction consistency can be met at the specified times, the transaction consistency can also be ensured definitely within the specified time period, thereby verifying the correctness, reliability, and stability of the data read method in the present disclosure.

Exemplarily, in a scenario that the data read method is applicable to an HTAC system, a TP cluster generally stores current state tuples and transitional state tuples, and an AP cluster stores historical state tuples. In this case, a gateway server may be set before the TP cluster and the AP cluster to serve as a coordinating node device of the HTAC system, the gateway server establishes communication connection with participating node devices related to the data read request, and delivers a data read request to each of the participating node devices in the TP cluster and in the AP cluster.

Any participating node device in the TP cluster or in the AP cluster may use the data read method provided in the embodiments of the present disclosure to find a common consistency point based on a snapshot isolation mechanism among the participating node devices, and output target tuples visible to a read transaction to the gateway server. After summarizing the target tuples, the gateway server initiates a commit procedure of the read transaction, and outputs the target tuples to a terminal of a requesting party of a read service, to ensure the transaction consistency of full state data that is read in the TP cluster and in the AP cluster at the same time, thereby implementing the consistency at a transaction level of a global read operation performed in a cross-cluster and cross-node manner.

Certainly, alternatively, a scheduler may randomly assign a node device as the coordinating node device when a global read transaction is started, to implement a decentralized global read operation and construct a lightweight and decentralized transaction processing mechanism (or read and write transaction processing procedures are both improved), thereby reducing network signaling overheads, optimizing performance of a read transaction, improving the efficiency of data reading, and avoiding a single-point performance bottleneck.

In the embodiments of the present disclosure, the provided transaction status extraction algorithm and full state visibility determination algorithm may form a decentralized full state data consistency read algorithm. In this way, consistency read performance of full state data in a distributed database system may be ensured, and a visibility determination algorithm in an MVCC mechanism is expanded, so that the distributed database system has a capability of reading data meeting a consistency state at any time point.

Figure 9:
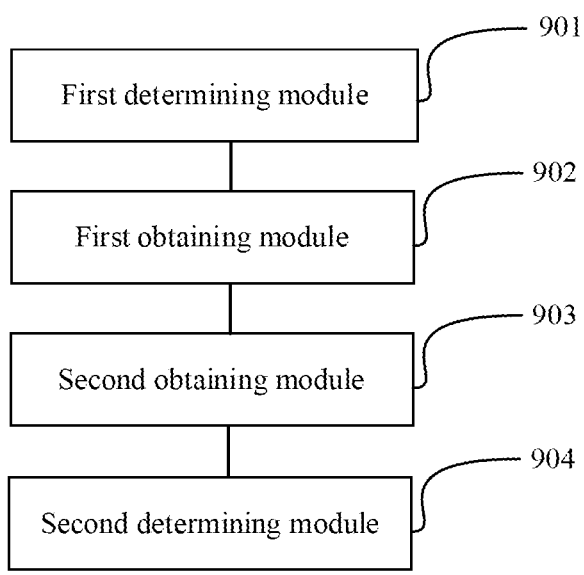
FIG. 9 is a schematic structural diagram of a data read apparatus according to an embodiment of the present disclosure.

FIG. 9 is a schematic structural diagram of a data read apparatus according to an embodiment of the present disclosure. Referring to FIG. 9, the apparatus includes the following modules. As can be appreciated, these modules may be implemented by hardware circuitry, such as a processing circuitry, that performs the described functionality.

a first determining module 901 is configured to, in a case that a data read request is received, determine, according to a read condition carried in the data read request, a plurality of tuples meeting the read condition.

a first obtaining module 902 is configured to obtain global transaction statuses of a plurality of global transactions corresponding to the plurality of tuples.

a second obtaining module 903 is configured to obtain global commit times of the plurality of global transactions according to the global transaction statuses of the plurality of global transactions.

a second determining module 904 is configured to determine a target tuple from the plurality of tuples based on the global commit times of the plurality of global transactions, the target tuple being visible relative to the data read request.

According to the apparatus provided in this embodiment of the present disclosure, when a data read request is received, according to a read condition carried in the data read request, a plurality of tuples meeting the read condition are determined. Since global transaction statuses of global transactions are maintained in the database system, global transaction statuses of a plurality of global transactions corresponding to the plurality of tuples are obtained. The obtained global transaction statuses are all global transaction statuses meeting a consistency condition for the data read request, so that global commit times of the plurality of global transactions are obtained according to the global transaction statuses of the plurality of global transactions. That is, in different global transaction statuses, different values are assigned to the global commit time, which is equivalent to quantifying the global transaction statuses meeting the consistency condition. Therefore, visibility determination may be performed on the tuples based on the global commit times of the plurality of global transactions, to determine a target tuple from the plurality of tuples, and the target tuple is visible relative to the data read request. The global transaction statuses are maintained in the database system, so that after the global transaction statuses meeting the consistency condition are found, to perform visibility determination conveniently, different global commit times are assigned to different global transaction statuses. Therefore, the visibility of a tuple is directly determined based on the global commit time, thereby avoiding the occurrence of a DRCC anomaly, and ensuring that data read in a data reading process is in a transaction-consistent state, namely, ensuring the transaction consistency of a global read operation in the database system.

In a possible implementation, when the data read request carries a specified time, the second obtaining module 903 is configured to, for any global transaction corresponding to any tuple in the plurality of tuples, in response to that a global transaction status of the global transaction at the specified time is a committed state or a committing state, set a global commit time of the global transaction to a value obtained by adding the specified time to any positive number in a case that a transaction finish time of the global transaction is greater than the specified time. The second obtaining module 903 may then set the global commit time of the global transaction to the transaction finish time in a case that the transaction finish time of the global transaction is not greater than the specified time.

In a possible implementation, when the data read request carries a specified time, the second obtaining module 903 is configured to, for any global transaction corresponding to any tuple in the plurality of tuples, in response to that a global transaction status of the global transaction at the specified time is any one of a running state, a preparing state, an aborted state, or an aborting state, set a global commit time of the global transaction to a value obtained by adding the specified time to any positive number.

In a possible implementation, when the data read request carries a specified time period, the second obtaining module 903 is configured to perform, based on a start time of the specified time period, an operation of obtaining global commit times of the plurality of global transactions at the start time. The second obtaining module 903 may then perform, based on an end time of the specified time period, an operation of obtaining global commit times of the plurality of global transactions at the end time.

In a possible implementation, the second determining module 904 is configured to, in a case that the data read request carries a specified time, for any tuple in the plurality of tuples, determine the tuple as a target tuple in response to that a global commit time of a global transaction generating the tuple is less than the specified time and a global commit time of a global transaction modifying the tuple is greater than the specified time.

In a possible implementation, the second determining module 904 is configured to, in a case that the data read request carries a specified time period, for any tuple in the plurality of tuples, determine the tuple as a target tuple in response to that a global commit time of a global transaction generating the tuple is less than an end time of the specified time period and a global commit time of a global transaction modifying the tuple is greater than a start time of the specified time period.

In a possible implementation, the first obtaining module 902 is configured to, for a global transaction identifier recorded on any tuple in the plurality of tuples, query whether a global transaction status corresponding to the global transaction identifier exists in a local transaction status list. The first obtaining module 902 may also obtain the global transaction status corresponding to the global transaction identifier in a case that the global transaction status exists. Alternatively, the first obtaining module 902 may transmit a query request to a plurality of node devices corresponding to the global transaction identifier and receive the global transaction status returned by any node device in the plurality of node devices in a case that the global transaction status does not exist.

In a possible implementation, each global transaction corresponds to one transaction status tuple, and the transaction status tuple includes at least one of a global transaction identifier, a transaction start time, a transaction finish time, a global transaction status, or a node device identifier of each global transaction.

In a possible implementation, based on the apparatus composition of FIG. 9, the apparatus is further configured to, in a case that any global write transaction is committed, transmit a data synchronization request to a target node device corresponding to the global write transaction, and receive a global transaction status returned by the target node device, the target node device being configured to store the global transaction status of the global write transaction. Alternatively, or in addition to, the device may, perform incremental synchronization with the target node device in response to that a currently run transaction relates to the target node device corresponding to the global write transaction, or may perform incremental synchronization with the target node device at intervals of a target time length.

During data reading, the data read apparatus provided in the foregoing embodiment is illustrated with an example of division of the foregoing functional modules. During actual application, the functions may be allocated to and completed by different functional modules according to requirements, that is, the internal structure of the computer device is divided into different functional modules, to implement all or some of the functions described above. In addition, the data read apparatus provided in the foregoing embodiment and the embodiments of the data read method belong to the same concept. For a specific implementation process, reference may be made to the embodiments of the data read method. Details are not described herein again.

Figure 10:
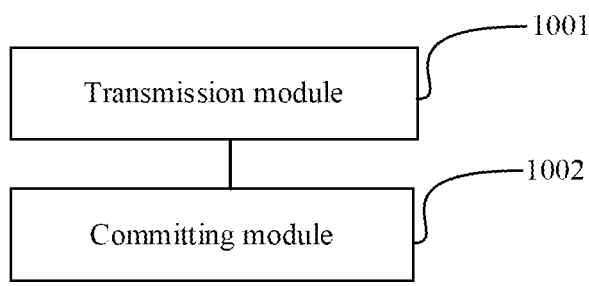
FIG. 10 is a schematic structural diagram of a data read apparatus according to an embodiment of the present disclosure.

FIG. 10 is a schematic structural diagram of a data read apparatus according to an embodiment of the present disclosure. Referring to FIG. 10, the apparatus includes the following modules, which may be implemented by circuitry, such as processing circuitry, that performs the described functions.

A transmission module 1001 is configured to, in a case that a global read transaction is obtained, transmit a data read request to a plurality of node devices related to the global read transaction.

A committing module 1002 is configured to commit the global read transaction in a case that a target tuple returned by each node device in the plurality of node devices is received. The target tuple is visible relative to the data read request, and the target tuple is determined from a plurality of tuples by each node device based on global commit times of a plurality of global transactions.

The transmission module 1001 is further configured to transmit the target tuple returned by each node device in a case that the global read transaction is committed.

According to the apparatus provided in this embodiment of the present disclosure, a data read request is transmitted to a plurality of node devices in a case that a global read transaction is obtained, and the global read transaction is committed when a target tuple returned by each node device is received. The target tuple is determined by each node device based on global commit times, so that the target tuple returned by each node device is a visible tuple meeting a consistency read condition. Therefore, when the global read transaction is committed, the target tuples are transmitted, to avoid a DRCC anomaly, thereby ensuring that data that is read in the data reading process is in a transaction-consistent state, namely, ensuring the transaction consistency of a global read operation in a database system.

In a possible implementation, based on the apparatus composition of FIG. 10, the apparatus is further configured to, for any global write transaction, transmit data prepare requests to a plurality of node devices related to the global write transaction. The apparatus is also configured to transmit a commit instruction to the plurality of node devices in a case that a prepare success response returned by each node device in the plurality of node devices is received, to instruct a target node device to record a transaction finish time of the global write transaction, and instruct the target node device to set a global transaction status of the global write transaction to a committed state. The apparatus may also transmit an abort instruction to the plurality of node devices in a case that a prepare failure response returned by any node device in the plurality of node devices is received, to instruct the target node device to set the global transaction status of the global write transaction to an aborting state, and in a case that an abort finish response returned by each node device in the plurality of node devices is received, instruct the target node device to record a transaction finish time of the global write transaction, and instruct the target node device to set the global transaction status of the global write transaction to an aborted state.

In a possible implementation, based on the apparatus composition of FIG. 10, the apparatus is further configured to select the target node device randomly from the plurality of node devices related to the global write transaction, or determine a node device that is first accessed in the plurality of node devices related to the global write transaction as the target node device.

During data reading, the data read apparatus provided in the foregoing embodiment is illustrated with an example of a division of the foregoing functional modules. During actual application, the functions may be allocated to and completed by different functional modules according to requirements, that is, the internal structure of the computer device is divided into different functional modules, to implement all or some of the functions described above. In addition, the data read apparatus provided in the foregoing embodiment and the embodiments of the data read method belong to the same concept. For a specific implementation process, reference may be made to the embodiments of the data read method. Details are not described herein again.

Figure 11:
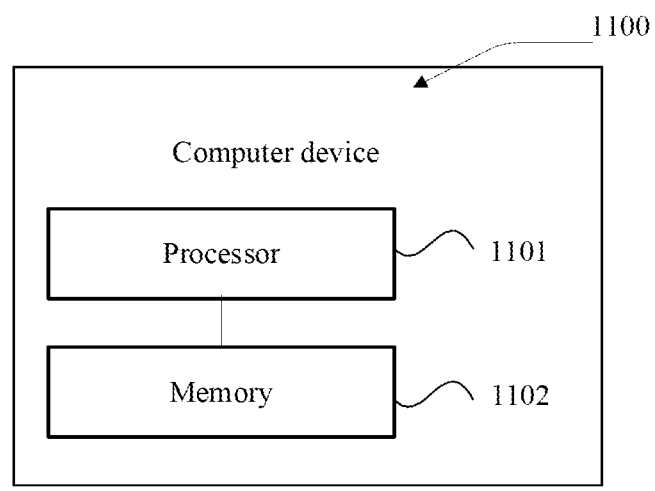
FIG. 11 is a schematic structural diagram of a computer device according to an embodiment of the present disclosure.

FIG. 11 is a schematic structural diagram of a computer device according to an embodiment of the present disclosure. Referring to FIG. 11, the computer device may be the coordinating node device or the participating node device involved in the foregoing embodiments. The computer device 1100 may include one or more processors (central processing units (CPUs), also known as processing circuitry) 1101 and one or more memories 1102. The memory 1102 stores at least one piece of program code, and the at least one piece of program code is loaded and executed by the processor 1101 to implement the data read method provided in the foregoing embodiments. Certainly, the computer device may also have components such as a wired or wireless network interface, a keyboard, and an input/output (I/O) interface for ease of I/O, and may further include other components for implementing functions of the device. Details are not described herein again. As can be appreciated, the computer device 100 may have other implementations leading to different performance characteristics without departing from the scope of the present disclosure.

In a possible implementation, the at least one piece of program code is loaded and executed by the one or more processors to implement the following operations. In a case that a data read request is received, a plurality of tuples meeting the read condition is determined according to a read condition carried in the data read request. Global transaction statuses of a plurality of global transactions corresponding to the plurality of tuples are also obtained, and global commit times of the plurality of global transactions according to the global transaction statuses of the plurality of global transactions are obtained. A target tuple from the plurality of tuples based on the global commit times of the plurality of global transactions is determined. The target tuple is visible relative to the data read request.

In a possible implementation, in a case that the data read request carries a specified time, the at least one piece of program code is loaded and executed by the one or more processors to implement the following operations. For any global transaction corresponding to any tuple in the plurality of tuples, in response to that a global transaction status of the global transaction at the specified time is a committed state or a committing state, a global commit time of the global transaction is set to a value obtained by adding the specified time to any positive number in a case that a transaction finish time of the global transaction is greater than the specified time. The global commit time of the global transaction is also set to the transaction finish time in a case that the transaction finish time of the global transaction is not greater than the specified time.

In a possible implementation, in a case that the data read request carries a specified time, the at least one piece of program code is loaded and executed by the one or more processors to implement the following operation. For any global transaction corresponding to any tuple in the plurality of tuples, in response to that a global transaction status of the global transaction at the specified time is any one of a running state, a preparing state, an aborted state, or an aborting state, a global commit time of the global transaction is set to a value obtained by adding the specified time to any positive number.

In a possible implementation, in a case that the data read request carries a specified time period, the at least one piece of program code is loaded and executed by the one or more processors to implement the following operations. Based on a start time of the specified time period, an operation of obtaining global commit times of the plurality of global transactions at the start time is performed. Based on an end time of the specified time period, an operation of obtaining global commit times of the plurality of global transactions at the end time is performed.

In a possible implementation, the at least one piece of program code is loaded and executed by the one or more processors to implement the following operation. In a case that the data read request carries a specified time, for any tuple in the plurality of tuples, the tuple are determined as a target tuple in response to that a global commit time of a global transaction generating the tuple is less than the specified time and a global commit time of a global transaction modifying the tuple is greater than the specified time.

In a possible implementation, the at least one piece of program code is loaded and executed by the one or more processors to implement the following operation. In a case that the data read request carries a specified time period, for any tuple in the plurality of tuples, the tuple is determined as a target tuple in response to that a global commit time of a global transaction generating the tuple is less than an end time of the specified time period and a global commit time of a global transaction modifying the tuple is greater than a start time of the specified time period.

In a possible implementation, the at least one piece of program code is loaded and executed by the one or more processors to implement the following operations. For a global transaction identifier recorded on any tuple in the plurality of tuples, whether a global transaction status corresponding to the global transaction identifier exists in a local transaction status list is queried. The global transaction status corresponding to the global transaction identifier in a case that the global transaction status exists is obtained. A query request to a plurality of node devices corresponding to the global transaction identifier is transmitted and the global transaction status returned by any node device in the plurality of node devices is received in a case that the global transaction status does not exist.

In a possible implementation, each global transaction corresponds to one transaction status tuple, and the transaction status tuple includes at least one of a global transaction identifier, a transaction start time, a transaction finish time, a global transaction status, or a node device identifier of each global transaction.

In a possible implementation, the at least one piece of program code is further loaded and executed by the one or more processors to implement the following operations. In a case that any global write transaction is committed, a data synchronization request is transmitted to a target node device corresponding to the global write transaction, and a global transaction status returned by the target node device is received. The target node device is configured to store the global transaction status of the global write transaction. Incremental synchronization with the target node device is performed in response to that a currently run transaction relates to the target node device corresponding to the global write transaction, and incremental synchronization with the target node device at intervals of a target time length is performed.

In an exemplary embodiment, the at least one piece of program code stored in the one or more memories of the computer device is loaded and executed by the one or more processors to implement the following operations. In a case that a global read transaction is obtained, a data read request is transmitted to a plurality of node devices related to the global read transaction. The global read transaction in a case that a target tuple returned by each node device in the plurality of node devices is received is committed. The target tuple is visible relative to the data read request, and the target tuple is determined from a plurality of tuples by each node device based on global commit times of a plurality of global transactions. The target tuple returned by each node device is transmitted in a case that the global read transaction is committed.

In a possible implementation, the at least one piece of program code is further loaded and executed by the one or more processors to implement the following operations. For any global write transaction, data prepare requests are transmitted to a plurality of node devices related to the global write transaction. A commit instruction is transmitted to the plurality of node devices in a case that a prepare success response returned by each node device in the plurality of node devices is received, to instruct a target node device to record a transaction finish time of the global write transaction, and instruct the target node device to set a global transaction status of the global write transaction to a committed state. An abort instruction is transmitted to the plurality of node devices in a case that a prepare failure response returned by any node device in the plurality of node devices is received, to instruct the target node device to set the global transaction status of the global write transaction to an aborting state. In a case that an abort finish response returned by each node device in the plurality of node devices is received, the target node device is instructed to record a transaction finish time of the global write transaction, and the target node device is instructed to set the global transaction status of the global write transaction to an aborted state.

In a possible implementation, the at least one piece of program code is further loaded and executed by the one or more processors to implement the following operations. The target node device is selected randomly from the plurality of node devices related to the global write transaction. Alternatively, a node device that is first accessed in the plurality of node devices related to the global write transaction is determined as the target node device.

In an exemplary embodiment, a non-transitory computer-readable storage medium, for example, a memory including at least one piece of program code is further provided. The at least one piece of program code may be executed by the one or more processors in the computer device to complete the data read method in the foregoing embodiments. For example, the computer-readable storage medium may be a read-only memory (ROM), a random access memory (RAM), a CD-ROM, a magnetic tape, a floppy disk, or an optical data storage device.

In a possible implementation, the at least one piece of program code is loaded and executed by the one or more processors to implement the following operations. in a case that a data read request is received and according to a read condition carried in the data read request, a plurality of tuples meeting the read condition are determined. Global transaction statuses of a plurality of global transactions corresponding to the plurality of tuples are obtained, as are global commit times of the plurality of global transactions according to the global transaction statuses of the plurality of global transactions. A target tuple is then determined from the plurality of tuples based on the global commit times of the plurality of global transactions, the target tuple being visible relative to the data read request.

In a possible implementation, in a case that the data read request carries a specified time, the at least one piece of program code is loaded and executed by the one or more processors to implement the following operations. For any global transaction corresponding to any tuple in the plurality of tuples, in response to that a global transaction status of the global transaction at the specified time is a committed state or a committing state, a global commit time of the global transaction is set to a value obtained by adding the specified time to any positive number in a case that a transaction finish time of the global transaction is greater than the specified time. The global commit time of the global transaction is set to the transaction finish time in a case that the transaction finish time of the global transaction is not greater than the specified time.

In a possible implementation, in a case that the data read request carries a specified time, the at least one piece of program code is loaded and executed by the one or more processors to implement the following operation. For any global transaction corresponding to any tuple in the plurality of tuples, in response to that a global transaction status of the global transaction at the specified time is any one of a running state, a preparing state, an aborted state, or an aborting state, a global commit time of the global transaction is set to a value obtained by adding the specified time to any positive number.

In a possible implementation, in a case that the data read request carries a specified time period, the at least one piece of program code is loaded and executed by the one or more processors to implement the following operations. Based on a start time of the specified time period, an operation of obtaining global commit times of the plurality of global transactions at the start time is performed. Based on an end time of the specified time period, an operation of obtaining global commit times of the plurality of global transactions at the end time is performed.

In a possible implementation, the at least one piece of program code is loaded and executed by the one or more processors to implement the following operation. In a case that the data read request carries a specified time, for any tuple in the plurality of tuples, the tuple is determined as a target tuple in response to that a global commit time of a global transaction generating the tuple is less than the specified time and a global commit time of a global transaction modifying the tuple is greater than the specified time.

In a possible implementation, the at least one piece of program code is loaded and executed by the one or more processors to implement the following operation. In a case that the data read request carries a specified time period, for any tuple in the plurality of tuples, the tuple is determined as a target tuple in response to that a global commit time of a global transaction generating the tuple is less than an end time of the specified time period and a global commit time of a global transaction modifying the tuple is greater than a start time of the specified time period.

In a possible implementation, the at least one piece of program code is loaded and executed by the one or more processors to implement the following operations. For a global transaction identifier recorded on any tuple in the plurality of tuples, whether a global transaction status corresponding to the global transaction identifier exists in a local transaction status list is queried. The global transaction status corresponding to the global transaction identifier is then obtained in a case that the global transaction status exists. Alternatively, a query request is transmitted to a plurality of node devices corresponding to the global transaction identifier and the global transaction status returned by any node device in the plurality of node devices is received in a case that the global transaction status does not exist.

In a possible implementation, each global transaction corresponds to one transaction status tuple, and the transaction status tuple includes at least one of a global transaction identifier, a transaction start time, a transaction finish time, a global transaction status, or a node device identifier of each global transaction.

In a possible implementation, the at least one piece of program code is further loaded and executed by the one or more processors to implement the following operations. In a case that any global write transaction is committed, a data synchronization request is transmitted to a target node device corresponding to the global write transaction, and a global transaction status returned by the target node device is received. The target node device is configured to store the global transaction status of the global write transaction. Incremental synchronization with the target node device is performed in response to that a currently run transaction relates to the target node device corresponding to the global write transaction. Incremental synchronization with the target node device is performed at intervals of a target time length.

In an exemplary embodiment, the at least one piece of program code stored in the computer-readable storage medium is loaded and executed by the one or more processors of the computer device to implement the following operations. In a case that a global read transaction is obtained, a data read request is transmitted to a plurality of node devices related to the global read transaction. The global read transaction is committed in a case that a target tuple returned by each node device in the plurality of node devices is received. The target tuple is visible relative to the data read request, and the target tuple is determined from a plurality of tuples by each node device based on global commit times of a plurality of global transactions. The target tuple returned by the node device is transmitted in a case that the global read transaction is committed.

In a possible implementation, the at least one piece of program code is loaded and executed by the one or more processors to implement the following operations. For any global write transaction, data prepare requests to a plurality of node devices related to the global write transaction is transmitted. a commit instruction to the plurality of node devices in a case that a prepare success response returned by each node device in the plurality of node devices is received, to instruct a target node device to record a transaction finish time of the global write transaction, and instruct the target node device to set a global transaction status of the global write transaction to a committed state. An abort instruction is transmitted to the plurality of node devices in a case that a prepare failure response returned by any node device in the plurality of node devices is received, to instruct the target node device to set the global transaction status of the global write transaction to an aborting state. In a case that an abort finish response returned by each node device in the plurality of node devices is received, the target node device is instructed to record a transaction finish time of the global write transaction, and the target node device is instructed to set the global transaction status of the global write transaction to an aborted state.

In a possible implementation, the at least one piece of program code is loaded and executed by the one or more processors to implement the following operations. The target node device is selected randomly from the plurality of node devices related to the global write transaction. Alternatively, a node device that is first accessed in the plurality of node devices related to the global write transaction is selected as the target node device.

In some embodiments, a computer program or a computer program product including at least one piece of program code is further provided. The computer program or the computer program product, when run on a computer device, causes the computer device to perform any possible implementation in the data read method provided in the foregoing embodiments, and details are not described herein again.

A person of ordinary skill in the art may understand that all or some of the steps of the foregoing embodiments may be implemented by hardware, or may be implemented by a program instructing relevant hardware. The program may be stored in a non-transitory computer-readable storage medium. The storage medium may be a read-only memory, a magnetic disk, an optical disc, or the like.

The foregoing descriptions are exemplary embodiments of the present disclosure, and are not intended to limit the present disclosure. Any modification, equivalent replacement, or improvement made within the spirit and principle of the present disclosure shall fall within the protection scope of the present disclosure.

What is claimed is:

1. A data read method, comprising:
   in a case that a data read request is received, determining, by processing circuitry and according to a read condition carried in the data read request, a plurality of tuples meeting the read condition;
   obtaining global transaction statuses of a plurality of global transactions corresponding to the plurality of tuples;
   obtaining, in response to the data read request carrying a specified time, global commit times of the plurality of global transactions according to the global transaction statuses of the plurality of global transactions; and
   determining a target tuple from the plurality of tuples based on the global commit times of the plurality of global transactions, the target tuple being visible relative to the data read request, wherein in response to one of the global transaction statuses of the corresponding global transaction in the plurality of global transactions at the specified time being one of a committed state, a committing state, a running state, a preparing state, an aborted state, or an aborting state, a respective global commit time in the global commit times is set as one of (i) a value that is a sum of the specified time and a positive number or (ii) a transaction finish time of the corresponding global transaction.

2. The data read method according to claim 1, wherein the one of the global transaction statuses of the corresponding global transaction at the specified time is the committed state or the committing state, the global transaction corresponds to a tuple in the plurality of tuples, and the obtaining the global commit times includes setting the global commit time of the corresponding global transaction to the value obtained by adding the specified time to the positive number in a case that a transaction finish time of the corresponding global transaction is greater than the specified time; and setting the global commit time of the corresponding global transaction to the transaction finish time in a case that the transaction finish time of the corresponding global transaction is not greater than the specified time.

3. The data read method according to claim 1, wherein the one of the global transaction statuses of the global transaction at the specified time is the running state, the preparing state, the aborted state, or the aborting state, the global transaction corresponds to a tuple in the plurality of tuples, and the obtaining the global commit times includes setting the global commit time of the global transaction to the value obtained by adding the specified time to the positive number.

4. The data read method according to claim 1, wherein in a case that the data read request carries a specified time period, the obtaining the global commit times comprises:

performing, based on a start time of the specified time period, an operation of obtaining the global commit times of the plurality of global transactions at the start time; and performing, based on an end time of the specified time period, an operation of obtaining the global commit times of the plurality of global transactions at the end time.

5. The data read method according to claim 1, wherein the determining the target tuple comprises:

in a case that the data read request carries the specified time, for a tuple in the plurality of tuples, determining the tuple as a target tuple in response to a global commit time of a global transaction generating the tuple being less than the specified time and a global commit time of a global transaction modifying the tuple is greater than the specified time.

6. The data read method according to claim 1, wherein the determining the target tuple comprises:

in a case that the data read request carries a specified time period, for a tuple in the plurality of tuples, determining the tuple as a target tuple in response to a global commit time of a global transaction generating the tuple being less than an end time of the specified time period and a global commit time of a global transaction modifying the tuple is greater than a start time of the specified time period.

7. The data read method according to claim 1, wherein the obtaining the global transaction statuses comprises:

for a global transaction identifier recorded on a tuple in the plurality of tuples, querying whether a global transaction status corresponding to the global transaction identifier exists in a local transaction status list; and obtaining the global transaction status corresponding to the global transaction identifier in a case that the global transaction status exists; or transmitting a query request to a plurality of participating node devices corresponding to the global transaction identifier and receiving the global transaction status returned by a participating node device in the plurality of participating node devices in a case that the global transaction status does not exist.

8. The data read method according to claim 1, wherein each global transaction corresponds to one transaction status tuple, and the transaction status tuple comprises at least one of a global transaction identifier, a transaction start time, a transaction finish time, a global transaction status, or a node device identifier of each global transaction.

9. The data read method according to claim 1, further comprising:

in a case that a global write transaction is committed, transmitting a data synchronization request to a target node device corresponding to the global write transaction, and receiving a global transaction status returned by the target node device, the target node device being configured to store the global transaction status of the global write transaction;

performing incremental synchronization with the target node device in response to that a currently run transaction relates to the target node device corresponding to the global write transaction; or performing incremental synchronization with the target node device at intervals of a target time length.

10. A data read method, comprising:

in a case that a global read transaction initiated by a coordinating node device is obtained, transmitting a data read request to a plurality of participating node devices related to the global read transaction by processing circuitry of the coordinating node device that is different from the plurality of participating node devices;

committing, by the processing circuitry of the coordinating node device, the global read transaction in a case that a target tuple returned by each participating node device in the plurality of participating node devices is received, the target tuple being visible relative to the data read request, the target tuple being determined from a plurality of tuples by each participating node device based on global commit times of a plurality of global transactions; and transmitting, by the processing circuitry of the coordinating node device, the target tuple returned by each participating node device in a case that the global read transaction is committed.

11. The data read method according to claim 10, further comprising:

for a global write transaction, transmitting data prepare requests to a plurality of participating node devices related to the global write transaction;

transmitting a commit instruction to the plurality of participating node devices in a case that a prepare success response returned by each participating node device in the plurality of participating node devices is received, to instruct a target node device to record a transaction finish time of the global write transaction, and instruct the target node device to set a global transaction status of the global write transaction to a committed state; and transmitting an abort instruction to the plurality of participating node devices in a case that a prepare failure response returned by a participating node device in the plurality of participating node devices is received, to instruct the target node device to set the global transaction status of the global write transaction to an aborting state; and in a case that an abort finish response returned by each participating node device in the plurality of participating node devices is received, instructing the target node device to record a transaction finish time of the global write transaction, and instructing the target node device to set the global transaction status of the global write transaction to an aborted state.

12. The data read method according to claim 11, further comprising:
selecting the target node device randomly from the plurality of participating node devices related to the global write transaction; or
determining a participating node device that is first accessed in the plurality of participating node devices related to the global write transaction as the target node device.

13. A data read apparatus, comprising:
processing circuitry configured to:
in a case that a data read request is received, determine, according to a read condition carried in the data read request, a plurality of tuples meeting the read condition;
obtain global transaction statuses of a plurality of global transactions corresponding to the plurality of tuples;
obtain, in response to the data read request carrying a specified time, global commit times of the plurality of global transactions according to the global transaction statuses of the plurality of global transactions; and
determine a target tuple from the plurality of tuples based on the global commit times of the plurality of global transactions, the target tuple being visible relative to the data read request wherein
in response to one of the global transaction statuses of the corresponding global transaction in the plurality of global transactions at the specified time being one of a committed state, a committing state, a running state, a preparing state, an aborted state, or an aborting state, a respective global commit time in the global commit times is set as one of (i) a value that is a sum of the specified time and a positive number or (ii) a transaction finish time of the corresponding global transaction.

14. The data read apparatus according to claim 13, wherein
the one of the global transaction statuses of the corresponding global transaction at the specified time is the committed state or the committing state, the global transaction corresponds to a tuple in the plurality of tuples, and
the processing circuitry is further configured to:
set the global commit time of the global transaction to the value obtained by adding the specified time to the positive number in a case that a transaction finish time of the global transaction is greater than the specified time; and
set the global commit time of the global transaction to the transaction finish time in a case that the transaction finish time of the global transaction is not greater than the specified time.

15. The data read apparatus according to claim 13, wherein
the one of the global transaction statuses of the global transaction at the specified time is the running state, the preparing state, the aborted state, or the aborting state,
the global transaction corresponds to a tuple in the plurality of tuples, and
the processing circuitry is further configured to set the global commit time of the global transaction to the value obtained by adding the specified time to the positive number.

16. The data read apparatus according to claim 13, wherein the processing circuitry is further configured to:
in a case that the data read request carries the specified time, for a tuple in the plurality of tuples, determine the tuple as a target tuple in response to a global commit time of a global transaction generating the tuple being less than the specified time and a global commit time of a global transaction modifying the tuple is greater than the specified time.

17. The data read apparatus according to claim 13, wherein the processing circuitry is further configured to:
in a case that the data read request carries a specified time period, for a tuple in the plurality of tuples, determining the tuple as a target tuple in response to a global commit time of a global transaction generating the tuple being less than an end time of the specified time period and a global commit time of a global transaction modifying the tuple is greater than a start time of the specified time period.

18. The data read apparatus according to claim 13, wherein each global transaction corresponds to one transaction status tuple, and the transaction status tuple comprises at least one of a global transaction identifier, a transaction start time, a transaction finish time, a global transaction status, or a node device identifier of each global transaction.

19. A non-transitory computer-readable medium storing instructions that, when executed by processing circuitry, cause the processing circuitry to perform the data read method according to claim 1.

20. A non-transitory computer-readable medium storing instructions that, when executed by processing circuitry, cause the processing circuitry to perform the data read method according to claim 10.

* * * * *